United States Patent
Kiyota

(10) Patent No.: US 9,836,938 B2
(45) Date of Patent: Dec. 5, 2017

(54) SHOVEL HAVING AUDIO OUTPUT DEVICE INSTALLED IN CAB

(71) Applicant: SUMITOMO HEAVY INDUSTRIES, LTD., Tokyo (JP)

(72) Inventor: Yoshihisa Kiyota, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 118 days.

(21) Appl. No.: 14/848,454

(22) Filed: Sep. 9, 2015

(65) Prior Publication Data

US 2016/0005286 A1    Jan. 7, 2016

Related U.S. Application Data

(63) Continuation of application No. PCT/JP2014/054289, filed on Feb. 24, 2014.

(30) Foreign Application Priority Data

Mar. 19, 2013  (JP) .................................. 2013-057401

(51) Int. Cl.
*B60Q 1/00* (2006.01)
*G08B 21/02* (2006.01)
(Continued)

(52) U.S. Cl.
CPC ............. *G08B 21/02* (2013.01); *B60Q 9/008* (2013.01); *E02F 9/24* (2013.01); *E02F 9/262* (2013.01); *G08B 13/196* (2013.01); *H04N 7/18* (2013.01)

(58) Field of Classification Search
CPC . A01C 21/00; A01M 7/0089; G06K 9/00805; H04N 7/18; E02F 9/24;
(Continued)

(56) References Cited

U.S. PATENT DOCUMENTS

2011/0254700 A1* 10/2011 Gharsalli ............... G08G 1/166
340/904
2012/0194950 A1* 8/2012 Koch ................... H02H 1/0015
361/42
(Continued)

FOREIGN PATENT DOCUMENTS

| EP | 2560140 | 2/2013 |
|----|---------|--------|
| JP | H07-102596 | 4/1995 |
| JP | H10-090406 | 4/1998 |
| JP | 2007-310587 | 11/2007 |

(Continued)

OTHER PUBLICATIONS

International Search Report dated May 13, 2014.

*Primary Examiner* — Daniel Previl
(74) *Attorney, Agent, or Firm* — IPUSA, PLLC

(57) ABSTRACT

A perimeter-monitoring device has a human presence determining part configured to determine presence or absence of a human in each of a plurality of monitoring spaces located around the shovel and an alarm controlling part configured to control a plurality of alarm output parts that are located in a cab of the shovel and emit an alarm to an operator. The alarm controlling part causes a right alarm output part to emit an alarm when it is determined that a human exists in a right monitoring space, causes a left alarm output part to emit an alarm when it is determined that a human exists in a left monitoring space, and causes a back alarm output part to emit an alarm when it is determined that a human exists in a back monitoring space.

5 Claims, 24 Drawing Sheets

(51) Int. Cl.
*E02F 9/24* (2006.01)
*E02F 9/26* (2006.01)
*G08B 13/196* (2006.01)
*B60Q 9/00* (2006.01)
*H04N 7/18* (2006.01)

(58) Field of Classification Search
CPC ... E02F 9/226; E02F 9/26; E02F 9/261; E02F 9/262; B60Q 9/008; B64D 1/18; E01C 19/004; E01C 23/088; E01C 23/127
USPC .............. 340/435, 904, 436, 443, 488, 506, 340/539.22, 539.11, 568.1, 573.3, 571
See application file for complete search history.

(56) References Cited

U.S. PATENT DOCUMENTS

| | | | | |
|---|---|---|---|---|
| 2013/0088593 | A1* | 4/2013 | Ishimoto | E02F 9/226 348/143 |
| 2013/0110357 | A1* | 5/2013 | Peterson | A01M 7/0089 701/50 |
| 2014/0172248 | A1* | 6/2014 | Nickel | F16P 3/142 701/50 |
| 2015/0142276 | A1 | 5/2015 | Wu et al. | |

FOREIGN PATENT DOCUMENTS

| | | |
|---|---|---|
| JP | 2008-179940 | 8/2008 |
| JP | 2009-193494 | 8/2009 |
| JP | 2010-112100 | 5/2010 |
| WO | 2006/106685 | 10/2006 |
| WO | 2012/161062 | 11/2012 |

\* cited by examiner

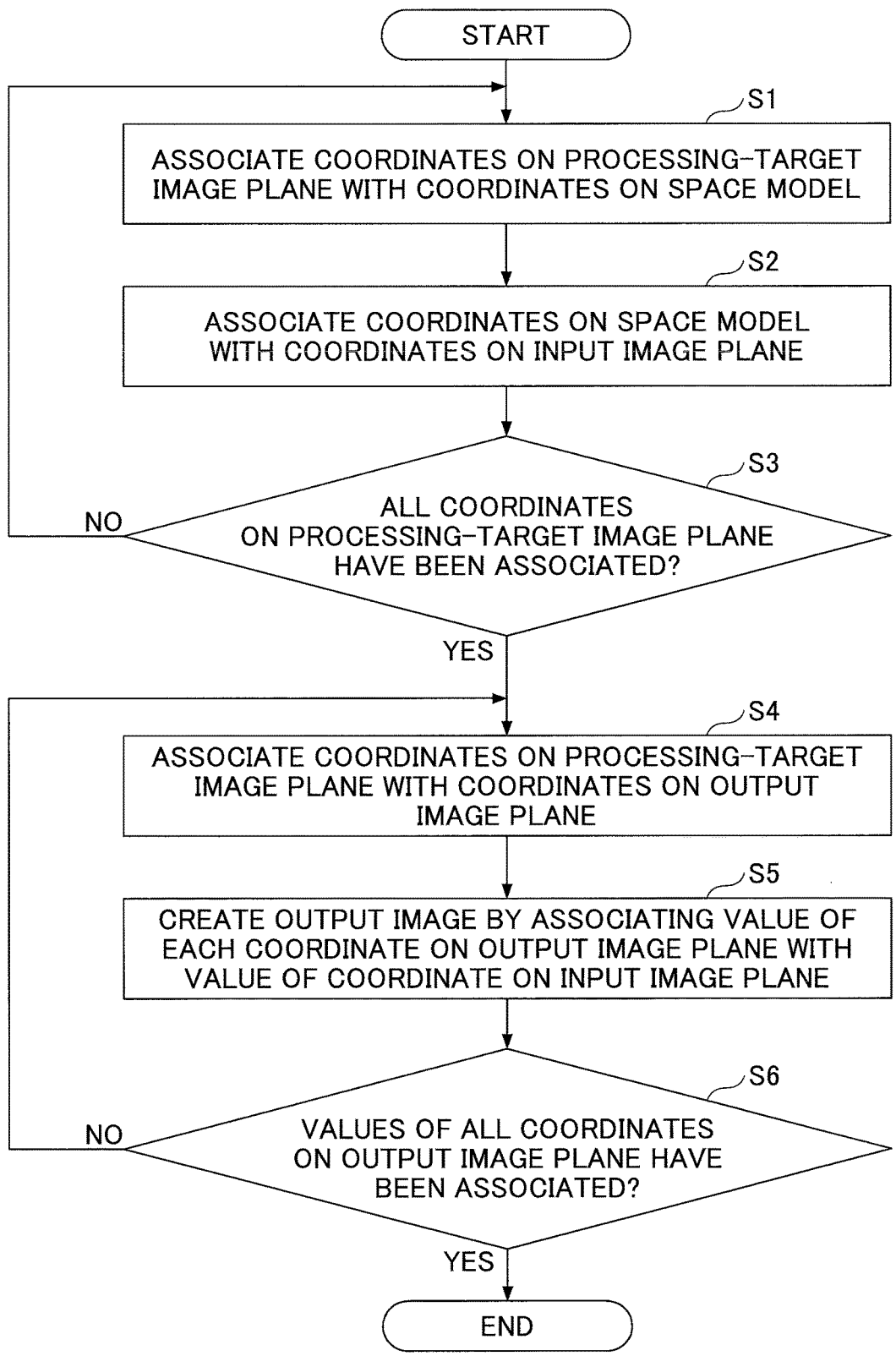

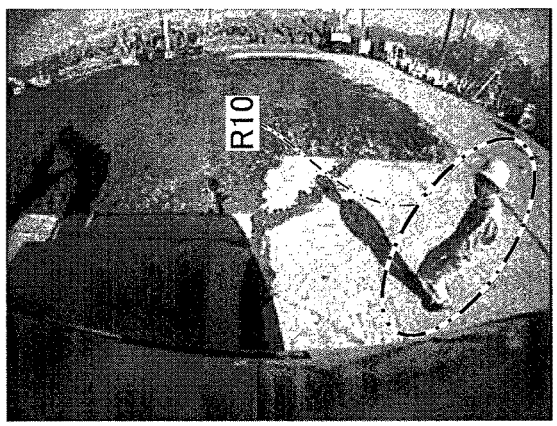
FIG.12C (INPUT IMAGE OF RIGHT CAMERA)
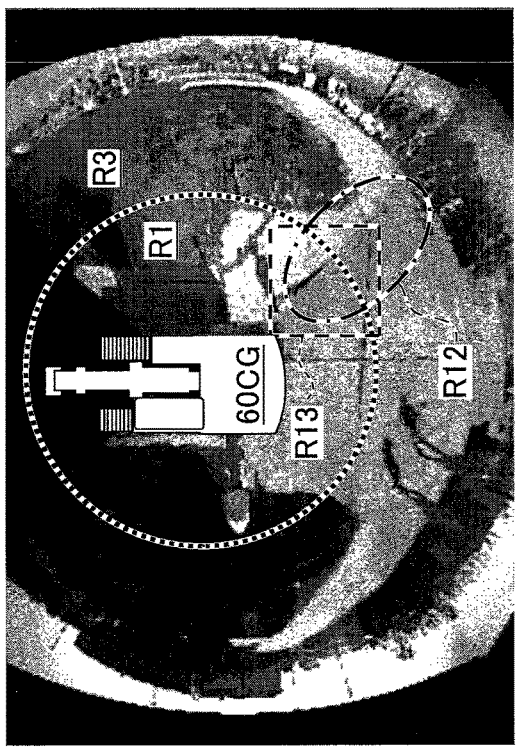
FIG.12A (OUTPUT IMAGE)
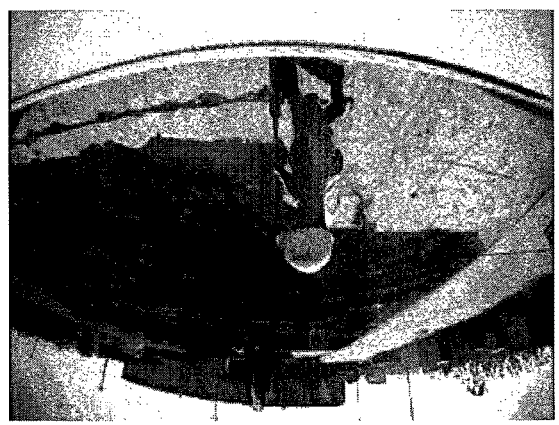
FIG.12B (INPUT IMAGE OF LEFT CAMERA)
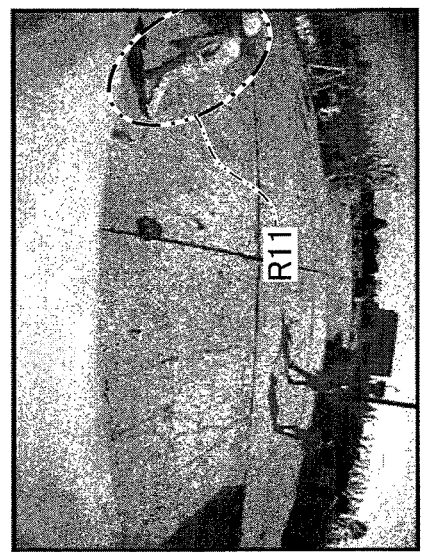
FIG.12D (INPUT IMAGE OF BACK CAMERA)

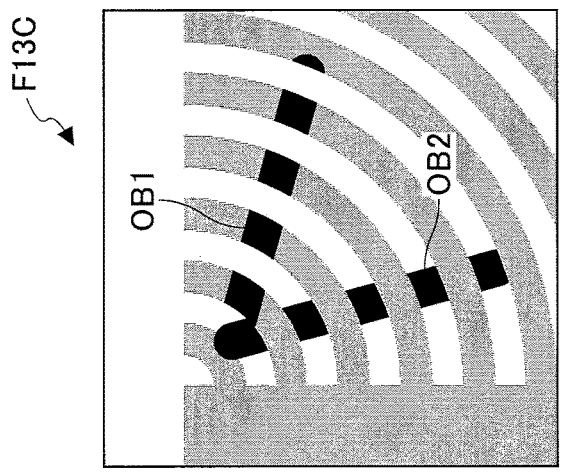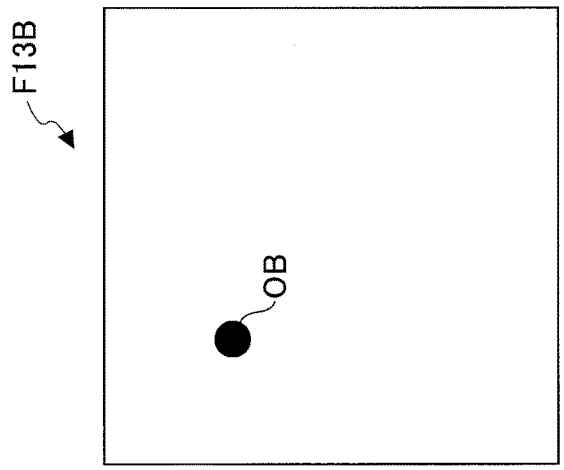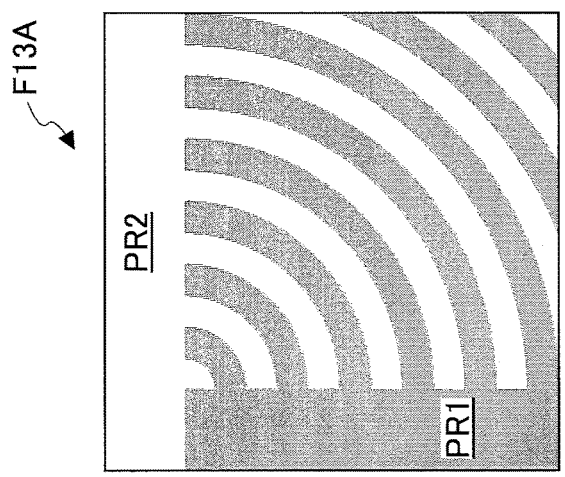

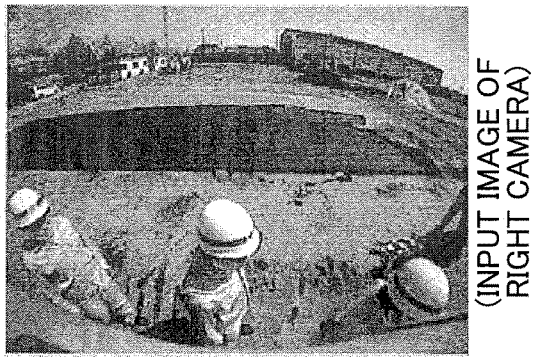
FIG.15C (INPUT IMAGE OF RIGHT CAMERA)
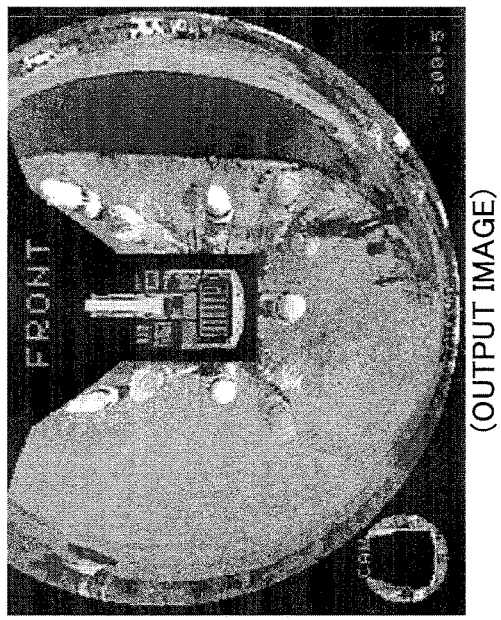
FIG.15A (OUTPUT IMAGE)
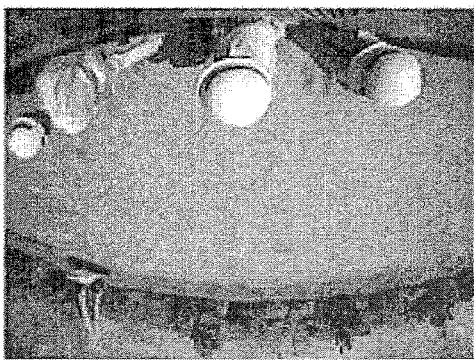
FIG.15B (INPUT IMAGE OF LEFT CAMERA)
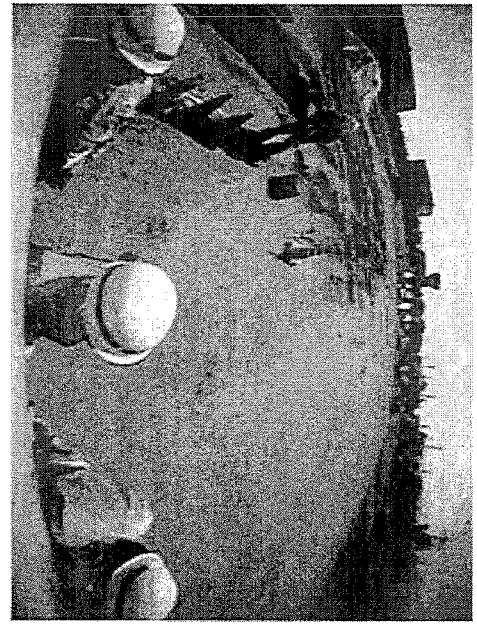
FIG.15D (INPUT IMAGE OF BACK CAMERA)

| PATTERN | DETERMINATION RESULT | | | INPUT IMAGE USED FOR CREATING OUTPUT IMAGE | CONTENT OF OUTPUT IMAGE |
| --- | --- | --- | --- | --- | --- |
| | LEFT MONITORING SPACE | BACK MONITORING SPACE | RIGHT MONITORING SPACE | | |
| 1 | O | × | × | LEFT CAMERA IMAGE | THROUGH-IMAGE |
| 2 | × | O | × | BACK CAMERA IMAGE | THROUGH-IMAGE |
| 3 | × | × | O | RIGHT CAMERA IMAGE | THROUGH-IMAGE |
| 4 | O | O | × | ALL INPUT IMAGES | VIRTUAL VIEWPOINT IMAGE |
| 5 | × | O | O | ALL INPUT IMAGES | VIRTUAL VIEWPOINT IMAGE |
| 6 | O | × | O | ALL INPUT IMAGES | VIRTUAL VIEWPOINT IMAGE |
| 7 | O | O | O | ALL INPUT IMAGES | VIRTUAL VIEWPOINT IMAGE |
| 8 | × | × | × | ALL INPUT IMAGES | VIRTUAL VIEWPOINT IMAGE |

| PATTERN | DETERMINATION RESULT | | | INPUT IMAGE USED FOR CREATING OUTPUT IMAGE | CONTENT OF OUTPUT IMAGE |
|---|---|---|---|---|---|
| | BACK MONITORING SPACE | BACK RIGHT MONITORING SPACE | RIGHT MONITORING SPACE | | |
| A | × | × | × | | |
| B | ○ | × | × | BACK CAMERA IMAGE + RIGHT CAMERA IMAGE | VIRTUAL VIEWPOINT IMAGE |
| C | × | × | ○ | BACK CAMERA IMAGE | THROUGH-IMAGE (1 PICTURE) |
| D | × | ○ | × | RIGHT CAMERA IMAGE | |
| E | ○ | ○ | × | | |
| F | ○ | × | × | | |
| G | × | ○ | ○ | BACK CAMERA IMAGE + RIGHT CAMERA IMAGE | THROUGH-IMAGE (2 PICTURES) |
| H | ○ | ○ | ○ | | |

P1

P2

P3   P3

P4  P5   P4

P6   P7

P8   P9  P8

P10 P11   P12 P10

D31

D32

D33

D34

D35

D36

SHOVEL HAVING AUDIO OUTPUT DEVICE INSTALLED IN CAB

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/054289 filed on Feb. 24, 2014, designating the U.S., which claims priority based on Japanese Patent Application No. 2013-057401 filed on Mar. 19, 2013. The entire contents of each of the foregoing applications are incorporated herein by reference.

BACKGROUND

Technical Field

The present invention relates to a perimeter-monitoring device for a working machine.

Description of Related Art

A perimeter-monitoring device that emits a warning sound when a worker has been detected within a monitoring range of an obstacle detection device mounted on a shovel is known. Also, a warning system that determines whether to emit a warning sound or not by determining whether a worker in a working area set up around a shovel is a co-worker or not based on a light emitting pattern of an LED attached to a helmet of the worker is known. Also, a safety apparatus that communicates with a forklift and a worker working near (around) the forklift, and controls whether to emit a warning sound based on this communication.

SUMMARY

There is provided according to an aspect of the invention a perimeter-monitoring device for a working machine including a human presence determining part configured to determine presence or absence of a human in each of a plurality of monitoring spaces located around the working machine, and an alarm controlling part configured to control a plurality of alarm output parts that are located in a cab of the working machine and emit an alarm to an operator. The plurality of monitoring spaces includes a first monitoring space and a second monitoring space that constitute two out of the plurality of monitoring spaces. The plurality of alarm output parts include a first alarm output part associated with the first monitoring space and a second alarm output part associated with the second monitoring space, that constitute two out of the plurality of alarm output parts. The alarm controlling part causes the first alarm output part to emit an alarm when it is determined that a human exists in the first monitoring space, and causes the second alarm output part to emit an alarm when it is determined that a human exists in the second monitoring space.

BRIEF DESCRIPTION OF THE DRAWINGS

FIG. 9 is a flowchart of a processing-target image creating process and an output image creating process;

FIG. 12A is a photographic illustration of an output image;

FIG. 12B is a photographic illustration of an input image captured by a left camera;

FIG. 12C is a photographic illustration of an input image captured by a right camera;

FIG. 12D is a photographic illustration of an input image captured by a back camera;

FIG. 13A is an illustration illustrating an output image portion corresponding to an overlapping area of an imaging space of the right camera and an imaging space of the back camera;

FIG. 13B is a plan view illustrating a state of a space area diagonally behind a shovel and, which indicates a present state of the space area captured by both the back camera and the right camera;

FIG. 13C is an illustration illustrating a portion of an output image created based on the input images captured by the back camera and the right camera;

FIG. 15A is a photographic illustration of an output image;

FIG. 15B is a photographic illustration of an input image taken by the left camera;

FIG. 15C is a photographic illustration of an input image taken by the right camera;

FIG. 15D is a photographic illustration of an input image taken by the back camera;

FIG. 16 is a correspondence table indicating a correspondence relationship between a determination result by a human presence determining part and an input image(s) used for generating an output image;

FIG. 19 is a correspondence table indicating a correspondence relationship between a determination result by a human presence determining part and an input image(s) used for generating an output image;

DETAILED DESCRIPTION

Any of the above technologies emit a warning sound through one and the same buzzer or speaker regardless of a direction of a worker within a predetermined range as seen from an operator of a shovel or the like. Thus, the operator of a shovel or the like cannot grasp intuitively which direction the worker is in.

Hereafter, a description will be given, with reference to the drawings, of an embodiment of the present invention.

Figure 1:
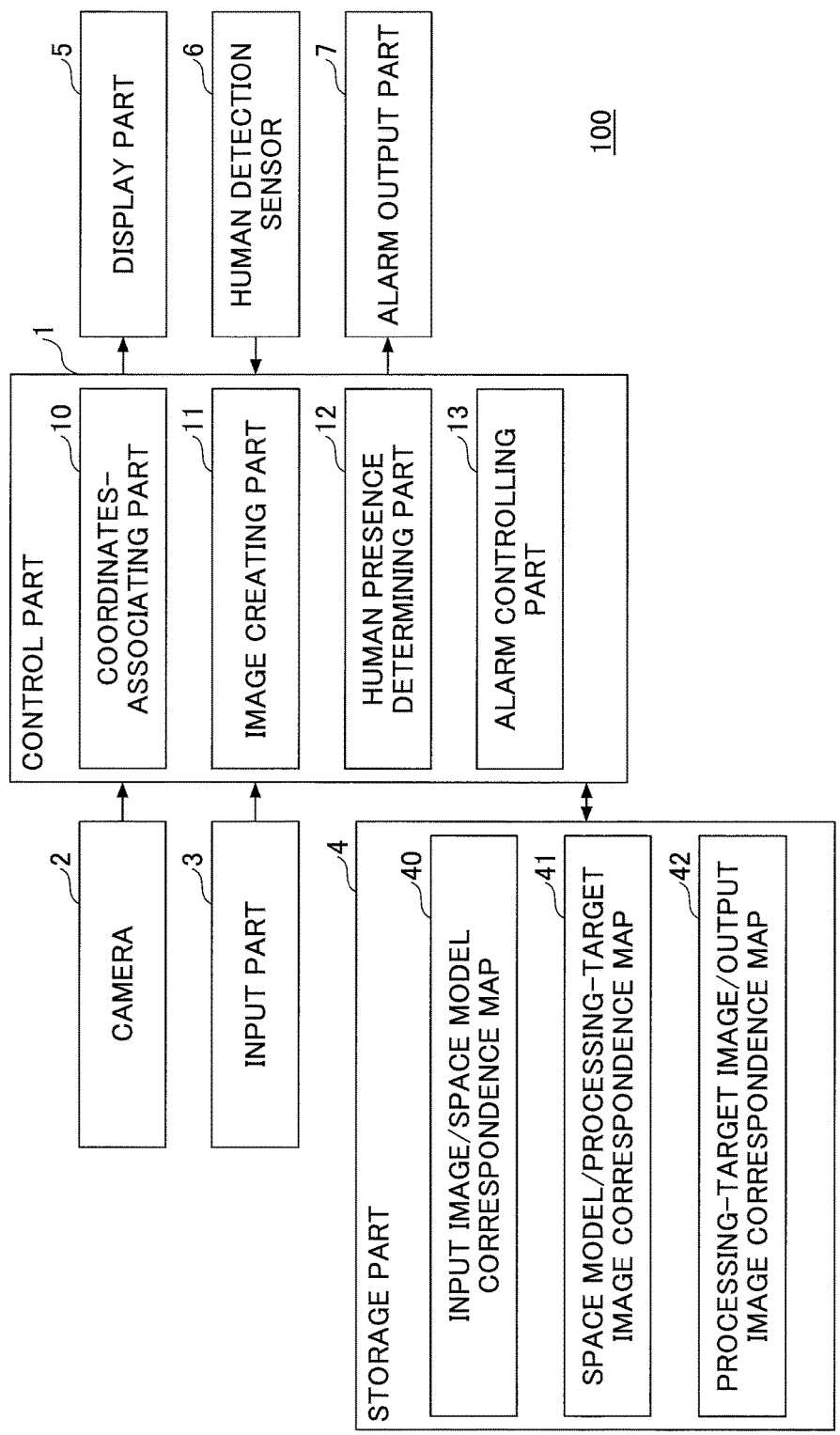
FIG. 1 is a block diagram schematically illustrating a structure of an image creating device according to an embodiment of the present invention.

FIG. 1 is a block diagram of an image creating device according to an embodiment of the present invention.

The image creating device 100 is an example of a perimeter-monitoring device for working machines that monitors a perimeter of a working machine. The image creating device 100 includes a control part 1, a camera 2, an input part 3, a storage part 4, a display part 5, a human detection sensor 6, and an alarm output part 7. Specifically, the image creating device 100 creates an output image based on an input image taken by the camera 2 mounted to the working machine, and presents the output image to an operator. Also, based on an output of the human detection sensor 6, the image creating device 100 changes contents of the output image to be presented.

Figure 2:
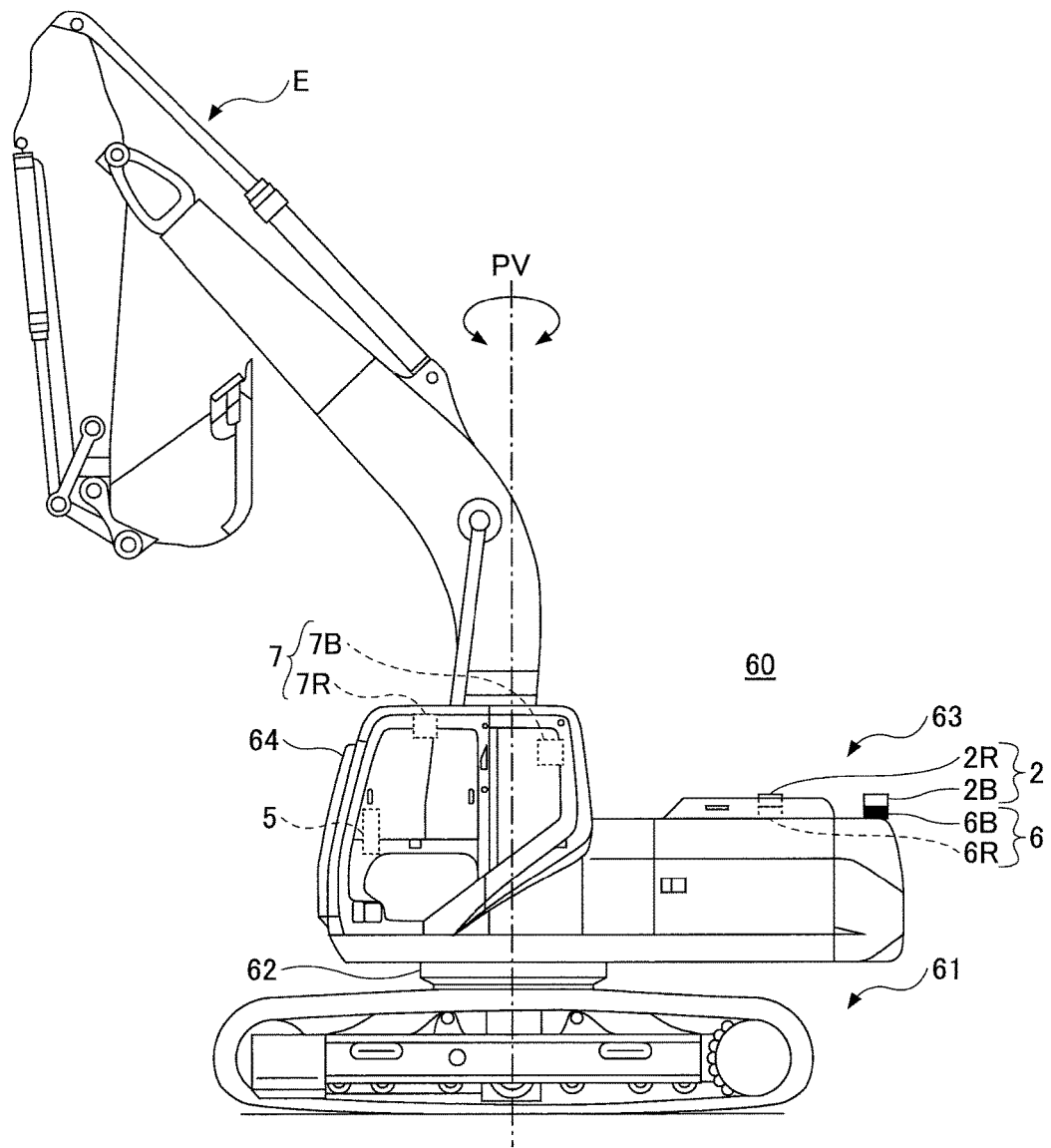
FIG. 2 is a side view of a shovel equipped with the image creating device.

FIG. 2 is a side view of a shovel 60 as a working machine to which the image creating device 100 is mounted. The shovel 60 is equipped with an upper turning body 63 via a turning mechanism 62 so that the upper turning body 63 turns about a turning axis PV.

The upper turning body 63 is equipped with a cab (operation room) 64 on the front-left part, an excavation attachment E in a front-center part, and the camera 2 (a right camera 2R and a back camera 2B) and the human detection sensor 6 (a right human detection sensor 6R and a back human detection sensor 6B) on the right surface and the back surface thereof. The display part 5 is installed at a position at which the operator in the cab 64 can visually recognize the display easily. Also, the alarm output part 7 (a right alarm output part 7R and a back alarm output part 7B) is installed on a right inner wall and a back inner wall.

Next, a description is given of each structural element of the image creating device 100.

The control part 1 is a computer provided with a CPU (Central Processing Unit), a RAM (Random Access Memory), a ROM (Read Only Memory), an NVRAM (Non-Volatile Random Access Memory), etc. In the present embodiment, for example, programs corresponding to each of a coordinates-associating part 10, an image creating part 11, a human presence determining part 12, and an alarm controlling part 13 mentioned later are stored in the ROM or the NVRAM so as to have the CPU to execute processes corresponding to each part while using the RAM as a temporary storage area.

The camera 2 is a device for acquiring an input image which represents a perimeter of the shovel. In the present embodiment, the camera 2 includes a right camera 2R and a back camera 2B mounted on the right surface and the back surface of the upper turning body 63 so that a picture of an area, which is a blind spot for the operator in the cab 64, can be taken (refer to FIG. 2). Hereinafter, the right camera 2R and the back camera 2B may be collectively referred to as a camera 2. The camera 2 is equipped with an image pick-up device, such as a CCD (Charge Coupled Device), a CMOS (Complementary Metal Oxide Semiconductor), etc. In addition, the camera 2 may be attached at positions (for example, a front surface and a left surface) other than the right surface and the back surface of the upper turning body 63, and may be equipped with a wide-angle lens or a fish-eye lens so that an image of a wide range can be taken.

Also, the camera 2 acquires an input image in response to a control signal from the control part 1, and outputs the acquired input image to the control part 1. In addition, when the camera 2 acquires the input image using a fish-eye lens or a wide-angle lens, the camera 2 outputs a corrected input image to the control part 1 in which an apparent distortion or tilting, which is caused by use of those lenses, is corrected. However, the camera 2 may output the acquired input image without correction. In such a case, the control part 1 corrects an apparent distortion and tilting.

The input part 3 is a device for allowing an operator to input various information to the image creating device 100. The input part 3 includes, for example, a touch panel, a button switch, a pointing device, a keyboard, etc.

The storage part 4 is a device for storing various information. The storage part 4 includes, for example, a hard disk, an optical disk, a semiconductor memory, etc.

The display part 5 is a device for displaying image information. The display part 5 includes, for example, a liquid crystal display or a projector, which is installed in the cab 64 (refer to FIG. 2) of the shovel 60 so as to display various images output from the control part 1.

The human detection sensor 6 is a device for detecting a human existing in a perimeter of the shovel 60. In the present embodiment, the human detection sensor 6 is attached to the right surface and the back surface of the upper turning body 63 (refer to FIG. 2) so that it can detect a human existing in an area, which is a blind spot for the operator in the cab 64.

The human detection sensor 6 is a sensor that detects a human distinctively from an object other than a human. For example, the human detection sensor 6 is a sensor that detects an energy change within a corresponding monitoring space. It includes a dynamic body detection sensor utilizing an output signal of a pyroelectric infrared sensor, a bolometric infrared sensor, an infrared camera, or the like. In the present embodiment, the human detection sensor 6 is based on a pyroelectric infrared sensor, and detects a dynamic body (a moving heat source) as a human. Also, a monitoring space of the right human detection sensor 6R is included in an imaging space of the right camera 2R, and a monitoring space of the back human detection sensor 6B is included in an imaging space of the back camera 2B.

Similar to the camera 2, the human detection sensor 6 may be attached to positions other than the right surface and the back surface of the upper turning body 63 (for example, the front surface and the left surface), or to any one of a front, left, right, and back surfaces, or to all surfaces.

The alarm output part 7 is a device for emitting an alarm to an operator of the shovel 60. For example, the alarm output part 7 is an alarm device that puts out at least one of sound and light, and includes an audio output device such as a buzzer, a speaker, or the like, a luminescent device such as an LED, a flashlight, or the like. In the present embodiment, the alarm output part 7 is a buzzer that puts out a warning sound, and is comprised of a right alarm output part 7R attached to the right inner wall of the cab 64 and a back alarm output part 7B attached to the back inner wall of the cab 64 (refer to FIG. 2).

Moreover, the image creating device 100 may create a processing-target image based on an input image, may create an output image by applying an image conversion process to the processing-target image, so that an operator can intuitively recognize a positional relationship or a sense of distance with surroundings, and may display the output image to the operator.

The "processing-target image" is an image created based on an input image. The "processing-target image" is subjected to an image conversion process (for example, a scale conversion process, an affine conversion process, a distortion conversion process, a viewpoint conversion process, etc.). Specifically, the "processing-target image" is an image suitable for an image conversion process, which is created from an input image by a camera capturing a ground surface from above. The input image includes an image of a scene (for example, a part of the sky) in a horizontal direction due to a wide angle of view. More specifically, the creating device 100 projects the input image onto a predetermined space model so as to prevent the image of a scene in a horizontal direction from being displayed unnaturally (for example, so as to prevent a part of the sky from being recognized as a ground surface). Then, the image creating device 100 creates a processing-target image by re-projecting the image projected on the space model onto another two-dimensional surface. However, the processing-target image may be used as an output image as it is without being subjected to an image conversion process.

The "space model" is a projection target of an input image. Specifically, the "space model" is comprised of one or more flat surfaces or curved surfaces including at least a flat surface or a curved surface other than a processing-target image plane, which is a plane on which the processing-target image is positioned. For example, the flat surface or the curved surface other than the processing-target image plane, which is a plane on which the processing-target image is positioned, is a flat surface parallel to the processing-target image plane or a flat surface or a curved surface forming an angle with the processing-target image plane.

The image creating device 100 may create an output image by applying an image conversion process to a projection image projected onto the space model without creating a processing-target image. The projection image may be used as an output image without being subjected to an image conversion process.

Figure 3B:
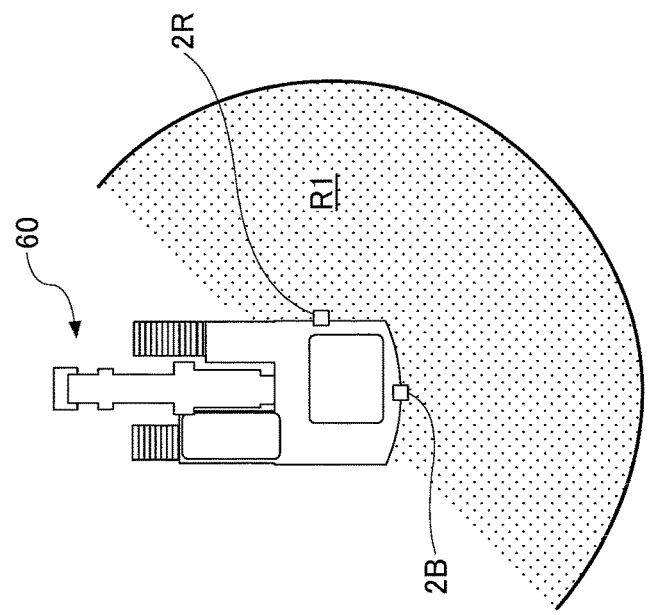
FIG. 3B is a plan view of the space model illustrated in FIG. 3A.
Figure 3A:
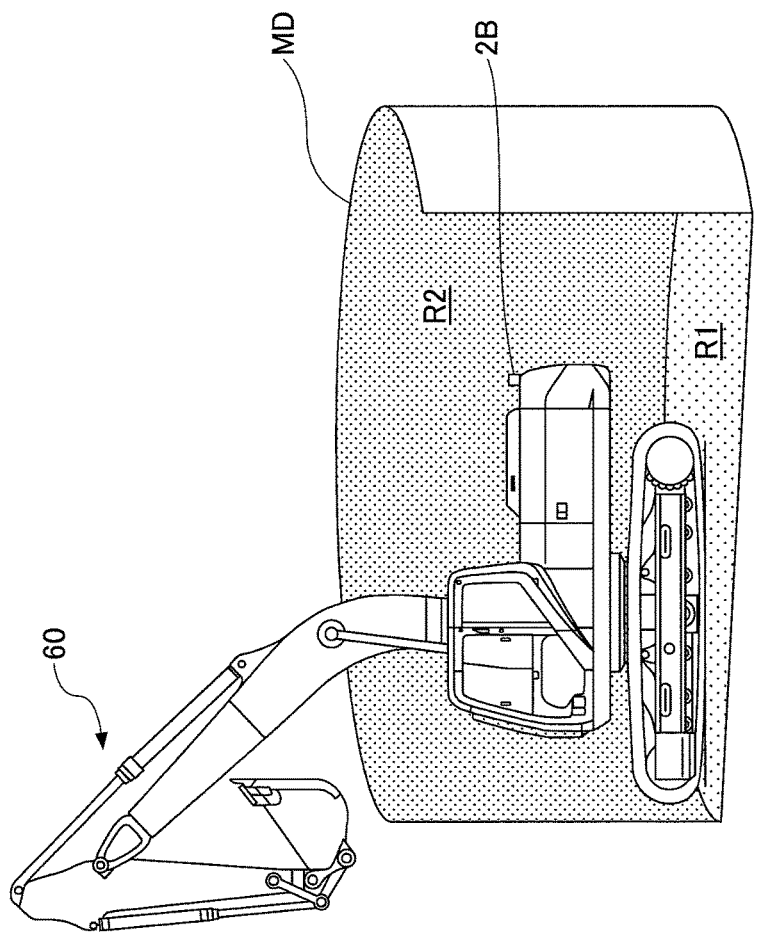
FIG. 3A is a perspective view of a space model to which an input image is projected.

FIGS. 3A and 3B are diagrams illustrating an example of the space model MD onto which an input image is projected. FIG. 3A illustrates a relationship between the shovel 60 and the space model MD when viewing the shovel 60 from the side. FIG. 3B illustrates a relationship between the shovel 60 and the space model MD when viewing the shovel 60 from above.

As illustrated in FIGS. 3A and 3B, the space model MD has a half-cylindrical form, and has a flat surface area R1 inside of its bottom surface and a curved surface area R2 inside of its side surface.

Figure 4:
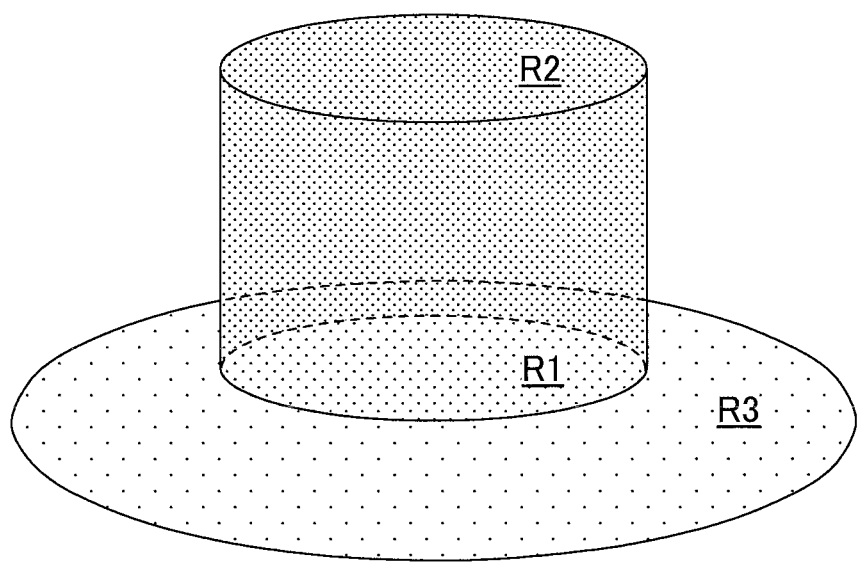
FIG. 4 is a diagram illustrating a relationship between the space model and a processing-target image plane.

FIG. 4 is a diagram illustrating an example of a relationship between the space model MD and a processing-target image plane R3. The processing-target image plane R3 is, for example, a plane including the flat surface area R1 of the space model MD. It should be noted that although the space model MD is illustrated as a cylindrical form, which is different from the half-cylindrical form as illustrated in FIG. 3A, the space model MD may be either of the half-cylindrical form and the cylindrical form. The same applies in figures mentioned below. Also, the processing-target image plane R3 may be a circular area including the flat surface area R1 of the space model MD as described above, or may be an annular area not including the flat surface area R1 of the space model MD.

Next, a description is given of various parts included in the control part 1.

The coordinates-associating part 10 is a part to associate coordinates on the input image plane on which the input image taken by the camera 2 is positioned, coordinates on the space model MD, and coordinates on the processing-target image plane R3. In the present embodiment, the coordinates-associating part 10 associates, for example, the coordinates on the input image plane, the coordinates on the space model MD and the coordinates on the processing-target image plane R3 based on various parameters relating to the camera 2, which are preconfigured or input through the input part 3, and a preconfigured mutual positional relationship between the input image plane, the space model MD and the processing-target image plane R3. Also, various parameters relating to the camera 2 are, for example, an optical center, a focal distance, a CCD size, an optical axis direction vector, a camera horizontal direction vector, a projection system, etc., of the camera 2. Then, the coordinates-associating part 10 stores these correspondence relationships into an input image/space model correspondence map 40 and a space model/processing-target image correspondence map 41.

However, when the coordinates-associating part 10 does not create a the processing-target image, the coordinates-associating part 10 omits associating coordinates on the space model MD with coordinates on the processing-target image plane R3, and omits storing their correspondence relationship into the space model/processing-target image correspondence map 41.

The image creating part 11 is a part to create an output image. In the present embodiment, the image creating part 11 associates coordinates on the processing-target image plane R3 with coordinates on the output image plane on which an output image is positioned by applying, for example, a scale conversion, an affine conversion, or a distortion conversion to a processing-target image.

Then, the image creating part 11 stores their correspondence relationship into the processing-target image/output image correspondence map 42 of the storage part 4. Then, the image creating part 11 creates an output image by relating a value of each pixel in the output image to a value of each pixel in the input image while referring to the input image/space model correspondence map 40 and the space model/processing-target image correspondence map 41. The value of each pixel is, for example, a brightness value, a color phase value, a chroma value, etc.

Moreover, the image creating part 11 associates coordinates on the processing-target image plane R3 with coordinates on the output image plane on which the output image is positioned, based on various parameters of a virtual camera that are preconfigured or input through the input part 3. The various parameters relating to the virtual camera are, for example, an optical center, a focal distance, a CCD size, an optical direction axis vector, a camera horizontal direction vector, a projection system, etc., of the virtual camera. Then, the image creating part 11 stores their correspondence relationship into the processing-target image/output image correspondence map 42 of the storage part 4. Then, the image creating part 11 creates an output image by relating a value of each pixel in the output image to a value of each pixel in the input image while referring to the input image/space model correspondence map 40 and the space model/processing-target image correspondence map 41.

Also, the image creating part 11 may create an output image by changing a scale of a processing-target image without using a concept of a virtual camera.

When the image creating part 11 does not create a processing-target image, the image creating part 11 associates coordinates on the space model MD with coordinates on the output image plane in accordance with the image conversion process applied. Then, the image creating part 11 creates an output image by relating a value of each pixel in the output image to a value of each pixel in an input image while referring to the input image/space model correspondence map 40. In this case, the image creating part 11 omits associating coordinates on the processing-target image plane R3 with the coordinates on the output image plane and also omits storing their correspondence relationship into the processing-target image/output image correspondence map 42.

Also, the image creating part 11 changes contents of the output image based on a determination result by the human presence determining part 12. Specifically, the image creating part 11 switches the input images used for creating an output image based on, for example, a determination result by the human presence determining part 12. Switchover of the input images used for creating the output image and the output image created based on the switched input image will hereinafter be described in detail.

The human presence determining part 12 is a part to determine whether a human exists or not in each of a plurality of monitoring spaces set up around a working machine. In the present embodiment, the human presence determining part 12 determines whether a human exists or not around the shovel 60 based on an output of the human detection sensor 6.

Also, the human presence determining part 12 may determine the presence or absence of a human in each of a plurality of monitoring spaces set up around the working machine, based on an input image captured by the camera 2. Specifically, the human presence determining part 12 may determine the presence or absence of a human around the working machine by using an image processing technology such as an optical flow, a pattern matching, or the like. It should be noted that the human presence determining part 12 may determine the presence or absence of a human around the working machine, based on an output of an image sensor other than the camera 2.

Alternatively, the human presence determining part 12 may determine the presence or absence of a human in each of a plurality of monitoring spaces, based on an output of the human detection sensor 6 and an output of an image sensor such as the camera 2 or the like.

The alarm controlling part 13 is a part to control the alarm output part 7. In the present embodiment, the alarm controlling part 13 controls the alarm output part 7 based on a determination result by the human presence determining part 12. A control of the alarm output part 7 by the alarm controlling part 13 will hereinafter be described in detail.

Next, a description is given of an example of a specific process by the coordinates-associating part 10 and the image creating part 11.

For example, the coordinates-associating part 10 can associate coordinates on an input image plane with coordinates on a space model by using the Hamilton's quaternion.

Figure 5:
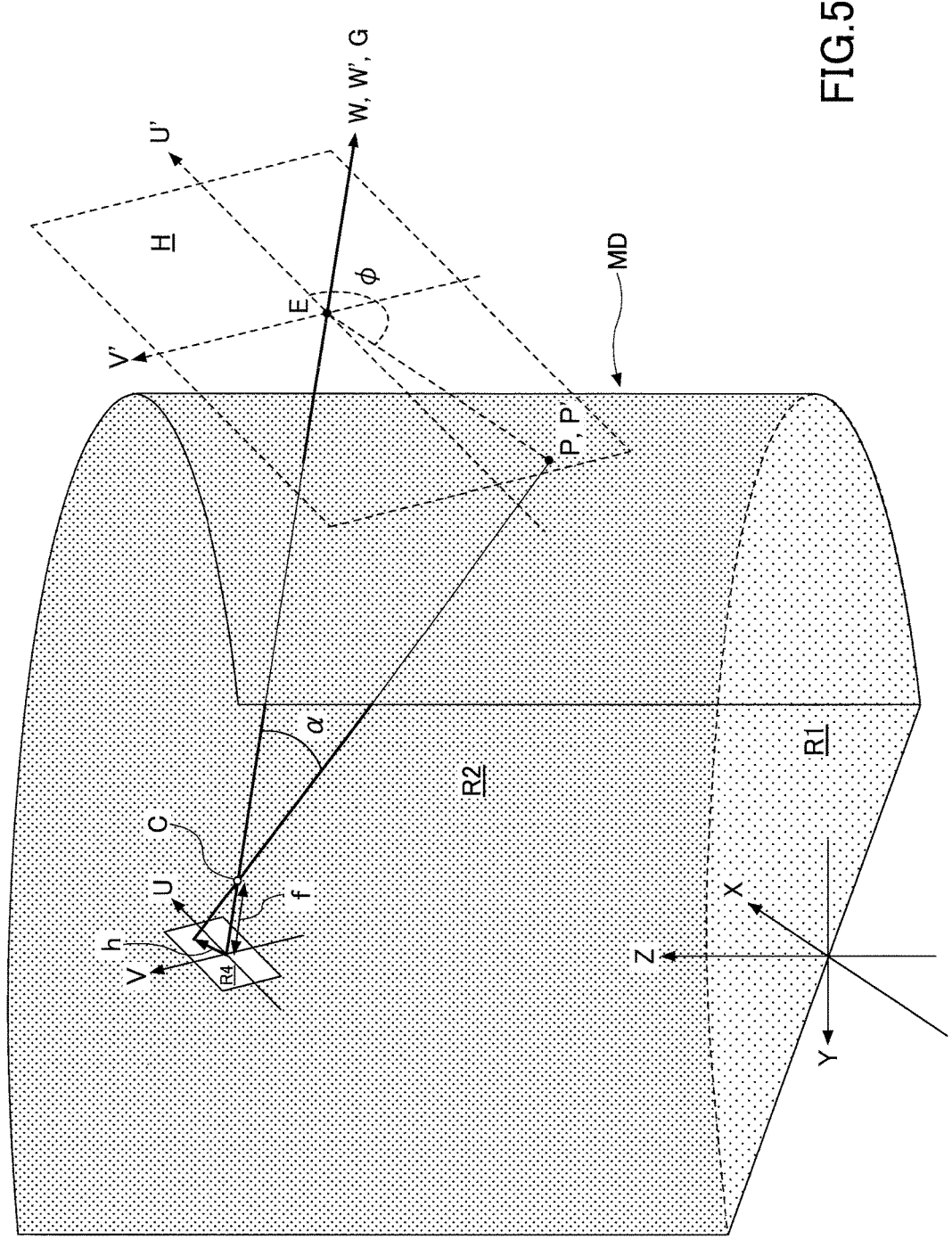
FIG. 5 is an illustration illustrating a correspondence between coordinates on the input image plane and coordinates on the space model.

FIG. 5 is a diagram illustrating a correspondence between coordinates on the input image plane and coordinates on the space model. The input image plane of the camera 2 is expressed as a single plane in a UVW rectangular coordinate system having an optical center C of the camera 2 as an origin. The space model is expressed as a steric surface in an XYZ rectangular coordinate system.

First, the coordinates-associating part 10 translates the origin of the XYZ coordinate system to the optical center C (the origin of the UVW coordinate system), and then rotates the XYZ coordinate system so as to align X-axis, Y-axis, Z-axis with U-axis, V-axis, W-axis, respectively. This is to convert coordinates on the space model (coordinates on the XYZ coordinate system) into coordinates on the input image plane (coordinates on the UVW coordinate system). It should be noted that the sign "−" of the "−W-axis" means that the direction of the Z-axis is opposite to the direction of the −W-axis. This is because a front direction of a camera corresponds to a +W direction in the UVW coordinate system and a downward vertical direction corresponds to a −Z direction in the XYZ coordinate system.

If there is a plurality of cameras 2, each of the cameras 2 has an individual UVW coordinate system. Thereby, the coordinates-associating part 10 translates and rotates the XYZ coordinate system with respect to each of the plurality of UVW coordinate systems.

The above-mentioned conversion is realized by translating the XYZ coordinate system so that the optical center C of the camera 2 becomes the origin of the XYZ coordinate system, and thereafter, rotating the XYZ coordinate system so that the X-axis coincides with the −W-axis and further rotating the XYZ coordinate system so that the X-axis coincides with the U-axis. Therefore, the coordinates-associating part 10 can integrate the two rotation operations into a single rotation operation by describing the conversion by Hamilton's quaternion.

By the way, a rotation to align a certain vector A with a different vector B corresponds to a process of rotating a normal line of a plane defined by the vector A and the vector B around the normal line as an axis by an angle formed between the vector A and the vector B. When the angle is set to θ, the angle θ is expressed by an inner product of the vector A and the vector B and is as follows.

$$\theta = \cos^{-1}\left(\frac{A \cdot B}{|A||B|}\right) \quad \text{[Formula 1]}$$

Moreover, the unit vector N of the normal line of the plane defined by the vector A and the vector B is expressed by an outer product of the vector A and the vector B and is as follows.

$$N = \frac{A \times B}{|A||B|\sin\theta} \quad \text{[Formula 2]}$$

It should be noted that when each of i, j and k is an imaginary number unit, the quaternion is a hypercomplex number satisfying the following relationship.

$$ii = jj = kk = ijk = -1 \quad \text{[Formula 3]}$$

In the present embodiment, the quaternion Q is expressed as follows, where a real component is t and pure imaginary components are a, b and c.

$$Q = (t; a, b, c) = t + ai + bj + ck \quad \text{[Formula 4]}$$

The conjugate quaternion of the quaternion Q is expressed as follows.

$$Q^* = (t; -a, -b, -c) = t - ai - bj - ck \quad \text{[Formula 5]}$$

The quaternion Q can express a three-dimensional vector (a, b, c) by the pure imaginary components a, b and c while setting the real component t to 0 (zero). In addition, the quaternion Q can express a rotating operation around an arbitrary vector as an axis by using respective components t, a, b and c.

Further, the quaternion Q can express consecutive rotating operations as a single rotating operation by integrating the rotating operations. Specifically, the quaternion Q can express, for example, a point D (ex, ey, ez), which is obtained by rotating an arbitrary point S (sx, sy, sz) around an arbitrary unit vector C (l, m, n) as an axis by an angle θ, as follows.

$$D = (0; ex, ey, ez) = QSQ^* \quad \text{[Formula 6]}$$

where, $S = (0; sx, sy, sz)$, $$Q = \left(\cos\frac{\theta}{2}; l\sin\frac{\theta}{2}, m\sin\frac{\theta}{2}, n\sin\frac{\theta}{2}\right)$$

Here, in the present embodiment, when the quaternion expressing a rotation, which aligns the Z-axis with the −W-axis, is $Q_z$, the point X on the X-axis in the XYZ coordinate system is moved to a point X'. Therefore, the point X' is expressed by the following relationship.

$$X' = Q_z X Q_z^* \quad \text{[Formula 7]}$$

Moreover, in the present embodiment, when the quaternion expressing a rotation, which aligns a line joining the point X' on the X-axis and the origin with the U-axis, is $Q_x$, the quaternion R expressing "a rotation to align the Z-axis with the −W-axis and further align the X-axis with the U-axis" is expressed by the following relationship.

$$R = Q_x Q_z \quad \text{[Formula 8]}$$

Thus, when an arbitrary coordinate P on the space model (the XYZ coordinate system) is represented as a coordinate P' on the input image plane (the UVW coordinate system), the coordinate P' is expressed by the following relationship.

$$P' = RPR^* \quad \text{[Formula 9]}$$

Also, due to the fact that the quaternion R remains unchanged in each of the cameras 2, the coordinates-associating part 10 can convert a coordinate on the space model (the XYZ coordinate system) into a coordinate on the input image plane (the UVW coordinate system) by just performing this operation.

After converting a coordinate on the space model (the XYZ coordinate system) to a coordinate on the input image plane (the UVW coordinate system), the coordinates-associating part 10 computes an incident angle α formed by a line segment CP' and the optical axis G of the camera 2. The line segment CP' is a line segment joining the optical center C (a coordinate on the UVW coordinate system) of the camera 2 and a coordinate P' on the UVW coordinate system corresponding to an arbitrary coordinate P on the space model.

Moreover, the coordinates-associating part 10 computes an argument φ and a length of a line segment EP' on a plane H which is parallel to the input image plane R4 (for example, a CCD plane) of the camera 2 and includes the coordinate P'. The line segment EP' is a line segment joining an intersection point E of the plane H with an optical axis G and the coordinate P'. The argument 9 is an angle formed by a U'-axis on the plane H and the line segment EP'.

In an optical system of a camera, normally, an image height h is a function of an incident angle α and a focal distance f. Accordingly, the coordinates-associating part 10 computes the image height h by selecting an appropriate projection system such as a normal projection (h=f tan α), an orthogonal projection (h=f sin α), a stereographic projection (h=2f tan(α/2)), an equisolid angle projection (h=f sin(α/2)), an equidistant projection (h=fα), etc.

Thereafter, the coordinates-associating part 10 decomposes the computed image height h to a U-component and a V-component on the UV coordinate system according to an argument φ, and divides them by a numerical value corresponding to a pixel size per one pixel of the input image plane R4. Thereby, the coordinates-associating part 10 can associate the coordinate P (P') on the space model MD with the coordinate on the input image plane R4.

It should be noted that when the pixel size per one pixel in the U-axis direction of the input image plane R4 is set to $a_U$, and the pixel size per one pixel in the V-axis direction of the input image plane R4 is set to $a_V$, a coordinate (u, v) on the input image plane R4 corresponding to the coordinate P (P') on the space model MD is expressed by the following formulas.

$$u = \frac{h\cos\phi}{a_U}$$ [Formula 10]

$$v = \frac{h\sin\phi}{a_V}$$ [Formula 11]

In this way, the coordinates-associating part 10 associates coordinates on the space model MD with coordinates on one or more input image planes R4 existing for each camera, and relates the coordinates on the space model MD, a camera identifier, and the coordinates on the input image plane R4, and stores their correspondence relationship into the input image/space model correspondence map 40.

Because the coordinates-associating part 10 operates the conversion of coordinates by using the quaternion, the coordinates-associating part 10 provides an advantage in that a gimbal lock is not generated unlike a case where a conversion of coordinates is operated using the Euler angle. However, the coordinates-associating part 10 is not limited to a configuration that performs an operation of conversion of coordinates using the quaternion. The coordinates-associating part 10 may perform an operation of conversion of coordinates using the Euler angle.

If the coordinates-associating part 10 can associate the coordinate P (P') on the space model with coordinates on a plurality of input image planes R4, the coordinates-associating part 10 may associate the coordinate P (P') with a coordinate on an input image plane R4 of a camera having the smallest incident angle α, or may associate the coordinate P (P') with a coordinate on an input image plane R4 selected by an operator.

Next, a description is given of a process of re-projecting a coordinate on the curved surface area R2 (a coordinate having a component in a Z-axis direction) out of coordinates on the space model MD, onto the processing-target image plane R3 on the XY plane.

Figure 6A:
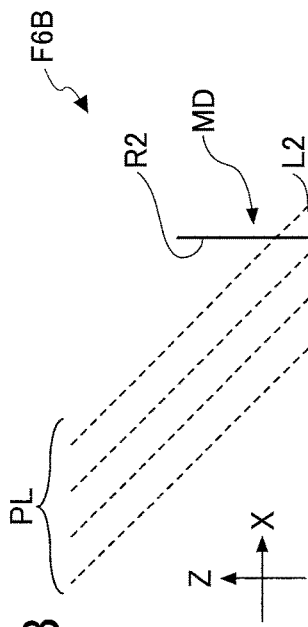
FIG. 6A is an illustration illustrating a correspondence between coordinates on the input image plane of a camera using a normal projection and coordinates on the space model.

FIGS. 6A~6D are diagrams illustrating a correspondence between coordinates associated by the coordinates-associating part 10. FIG. 6A is a diagram illustrating a correspondence relationship between coordinates on the input image plane R4 of the camera 2 using a normal projection (h=f tan α) as an example and coordinates on the space model MD. The coordinates-associating part 10 associates both coordinates with each other by causing each line segment, which joins a coordinate on the input image plane R4 of the camera 2 and a coordinate on the space model MD corresponding to the coordinate on the input image plane R4, passes through the optical center C of the camera 2.

In the example of FIG. 6A, the coordinates-associating part 10 associates a coordinate K1 on the input image plane R4 of the camera 2 with a coordinate L1 on the flat surface area R1 of the space model MD, and associates a coordinate K2 on the input image plane R4 of the camera 2 with a coordinate L2 on the curved surface area R2 of the space model MD. In this situation, both a line segment K1-L1 and a line segment K2-L2 pass through the optical center C of the camera 2.

It should be noted that when the camera 2 uses projection systems (for example, an orthogonal projection, a stereographic projection, an equisolid angle projection, an equidistant projection, etc.) other than the normal projection system, the coordinates-associating part 10 associates the coordinates K1 and K2 on the input image plane R4 with the coordinates L1 and L2 on the space model MD according to the respective projection systems.

Specifically, the coordinates-associating part 10 associates the coordinates on the input image plane with the coordinates on the space model MD based on a predetermined function (for example, an orthogonal projection (h=f sin α), a stereographic projection (h=2f tan(α/2)), an equisolid angle projection (h=f sin(α/2)), an equidistant projection (h=fα), etc.). In this case, the line segment K1-L1 and the line segment K2-L2 do not pass through the optical center C of the camera 2.

Figure 6B:
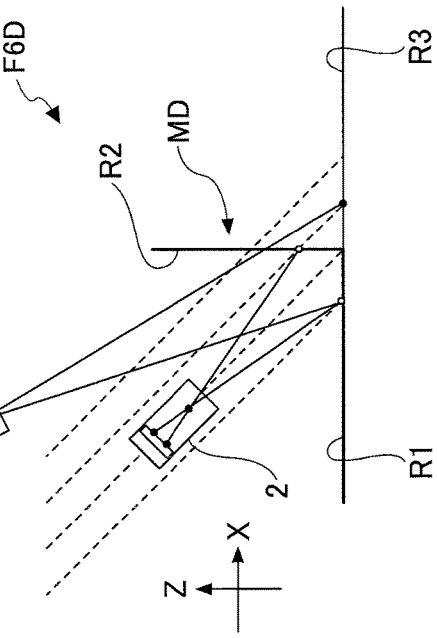
FIG. 6B is an illustration illustrating a correspondence between coordinates on a curved surface area of the space model and coordinates on a processing-target image plane.

FIG. 6B is a diagram illustrating a correspondence relationship between coordinates on the curved surface area R2 of the space model MD and coordinates on the processing-target image plane R3. The coordinates-associating part 10 introduces parallel lines PL, which are parallel lines positioned on the XZ-plane and form an angle β with the processing-target image plane R3. Then, the coordinates-associating part 10 associates both coordinates with each other so that both the coordinates on the curved surface area R2 of the space model MD and the coordinates on the processing-target image plane R3 corresponding to the coordinates on the curved surface area R2 are positioned on one of the parallel lines PL.

In the example of FIG. 6B, due to the fact that the coordinate L2 on the curved surface area R2 of the space model MD and a coordinate M2 on the processing-target image plane R3 are positioned on a common parallel line, the coordinates-associating part 10 associates both coordinates with each other.

Also, the coordinates-associating part 10 can associate coordinates on the flat surface area R1 of the space model MD with coordinates on the processing-target image plane R3 using the parallel lines PL, similar to the coordinates on the curved surface area R2. However, in the example of FIG. 6B, the flat surface area R1 and the processing-target image plane R3 lie on a common plane. Therefore, the coordinate L1 on the flat surface area R1 on the space model MD and the coordinate M1 on the processing-target image plane R3 have the same coordinate value.

In this way, the coordinates-associating part 10 associates coordinates on the space model MD with coordinates on the processing-target image plane R3, and stores the coordinates on the space model MD and the coordinates on the processing-target image R3 in a linked relation into the space model/processing-target image correspondence map 41.

Figure 6C:
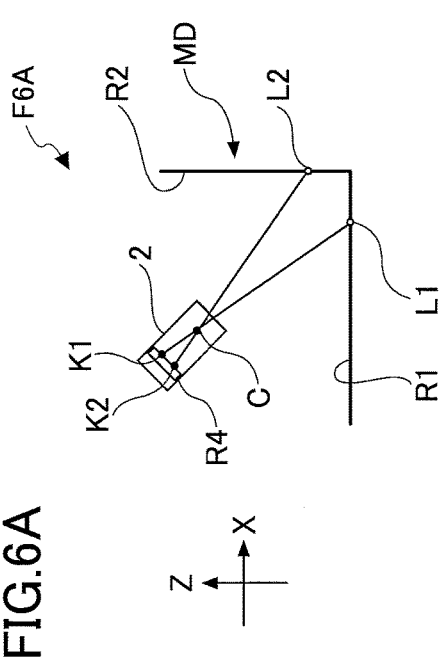
FIG. 6C is an illustration illustrating a correspondence between coordinates on the processing-target image plane and coordinates on an output image plane of a virtual camera.

FIG. 6C is a diagram illustrating a correspondence relationship between coordinates on the processing-target image plane R3 and coordinates on the output image plane R5 of a virtual camera 2V using, as an example, a normal projection (h=f tan α). The image creating part 11 associates both coordinates with each other so that each line segment, which joins a coordinate on the output image plane R5 of the virtual camera 2V and a coordinate on the processing-target image plane R3 corresponding to the coordinate on the output image plane R5, passes through the optical center CV of the virtual camera 2V.

In the example of FIG. 6C, the image creating part 11 associates a coordinate N1 on the output image plane R5 of the virtual camera 2V with the coordinate M1 on the processing-target image plane R3 (the flat surface area R1 of the space model MD), and associates a coordinate N2 on the output image plane R5 of the virtual camera 2V with the coordinate M2 on the processing-target image plane R3. In this situation, both a line segment M1-N1 and a line segment M2-N2 pass through the optical center CV of the virtual camera 2V.

If the virtual camera 2V uses projection systems (for example, an orthogonal projection, a stereographic projection, an equisolid angle projection, an equidistant projection, etc.) other than the normal projection, the image creating part 11 associates the coordinates N1 and N2 on the output image plane R5 of the virtual camera 2V with the coordinates M1 and M2 on the processing-target image plane R3 according to the respective projection systems.

Specifically, the image creating part 11 associates the coordinates on the output image plane R5 with the coordinates on the processing-target image plane R3 based on a predetermined function (for example, an orthogonal projection ($h=f \sin \alpha$), a stereographic projection ($h=2f \tan(\alpha/2)$), an equisolid angle projection ($h=f \sin(\alpha/2)$), an equidistant projection ($h=f\alpha$), etc.). In this case, the line segment M1-N1 and the line segment M2-N2 do not pass through the optical center CV of the virtual camera 2V.

In this way, the image creating part 11 associates the coordinates on the output image plane R5 with the coordinates on the processing-target image plane R3, and stores the coordinates on the output image plane R5 and the coordinates on the processing-target image R3 in a linked relation into the processing-target image/output image correspondence map 42. Then, the image creating part 11 creates an output image by relating a value of each pixel in the output image to a value of each pixel in the input image while referring to the input image/space model correspondence map 40 and the space model/processing-target image correspondence map 41.

Figure 6D:
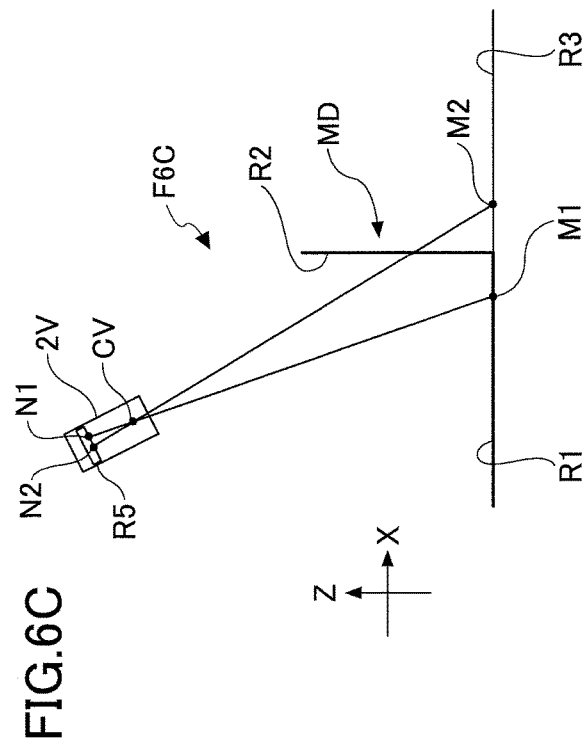
FIG. 6D is an illustration illustrating a mutual positional relationship between the camera, the virtual camera, the flat surface area and curved surface area of the space model, and the processing-target image plane.

Also, FIG. 6D is a combination of FIGS. 6A~6C, and illustrates a mutual positional relationship between the camera 2, the virtual camera 2V, the flat surface area R1 and the curved surface area R2 of the space model MD, and the processing-target image plane R3.

Figure 7A:
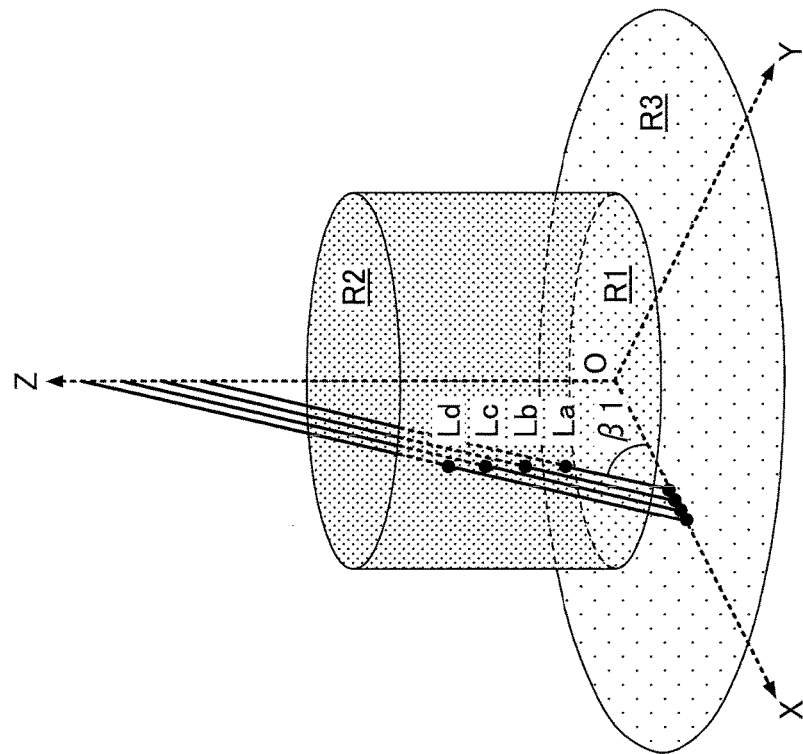
FIG. 7A is an illustration of a case where an angle is formed between parallel lines positioned on an DD-plane and the processing-target image plane.
Figure 7B:
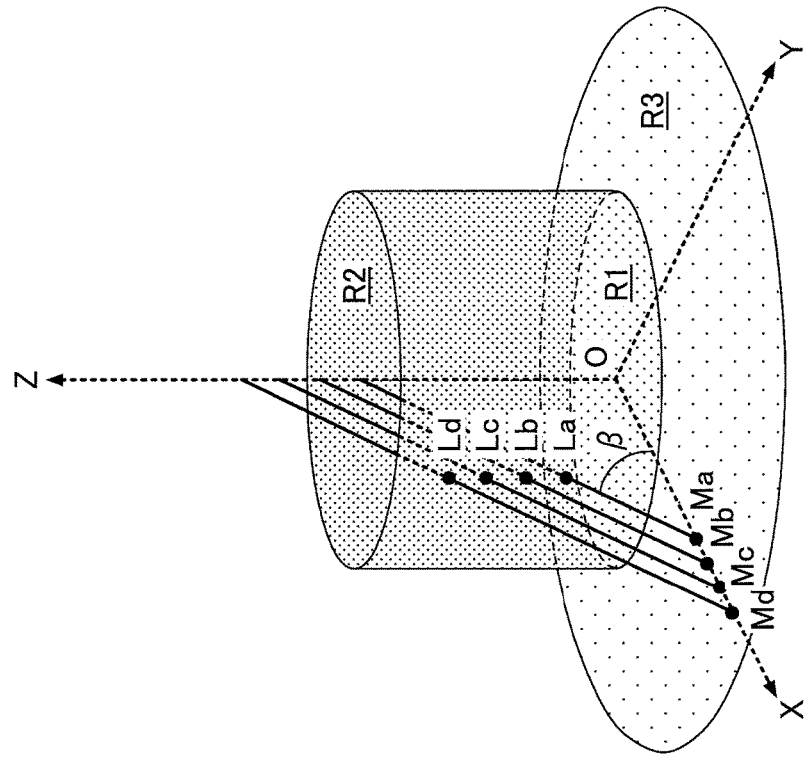
FIG. 7B is an illustration of a case where a different angle is formed between the parallel lines positioned on the XZ-plane and the processing-target image plane.

Next, a description is given, with reference to FIGS. 7A and 7B, of an action of the parallel lines PL, which the coordinates-associating part 10 introduces to associate coordinates on the space model MD with coordinates on the processing-target image plane R3.

FIG. 7A is a diagram of a case where an angle β is formed between the parallel lines PL positioned on the XZ-plane and the processing-target image plane R3. FIG. 7B is a diagram of a case where an angle β1 (β1>β) is formed between the parallel lines PL positioned on the XZ-plane and the processing-target image plane R3. Also, coordinates La~Ld on the curved surface area R2 of the space model MD in FIGS. 7A and 7B correspond to coordinates Ma~Md on the processing-target image plane R3, respectively. Intervals of the coordinates La~Ld in FIG. 7A are equal to intervals of the coordinates La~Ld in FIG. 7B, respectively. Although it is assumed that the parallel lines PL are supposed to be on the XZ-plane for the purpose of simplification of description, actually, the parallel lines PL radially extend from all points on the Z-axis toward the processing-target image plane R3. The Z-axis in this case is referred to as "re-projection axis".

As illustrated in FIGS. 7A and 7B, the intervals of the coordinates Ma~Md on the processing-target image plane R3 decease linearly with increase in the angle between the parallel lines PL and processing-target image plane R3. That is, the intervals of the coordinates Ma~Md decrease uniformly irrespective of the distance between the curved surface area R2 of the space model MD and each of the coordinates Ma~Md. On the other hand, in the example illustrated in FIGS. 7A and 7B, coordinates on the flat surface area R1 of the space model MD are not converted to coordinates on the processing-target image plane R3. Thus, intervals of the coordinates on the flat surface area R1 of the space model MD do not change.

The change in the intervals of these coordinates means that only an image part corresponding to the image projected on the curved surface area R2 of the space model MD, out of image parts on the output image plane R5 (refer to FIG. 6C), is enlarged or reduced linearly.

Figure 8A:
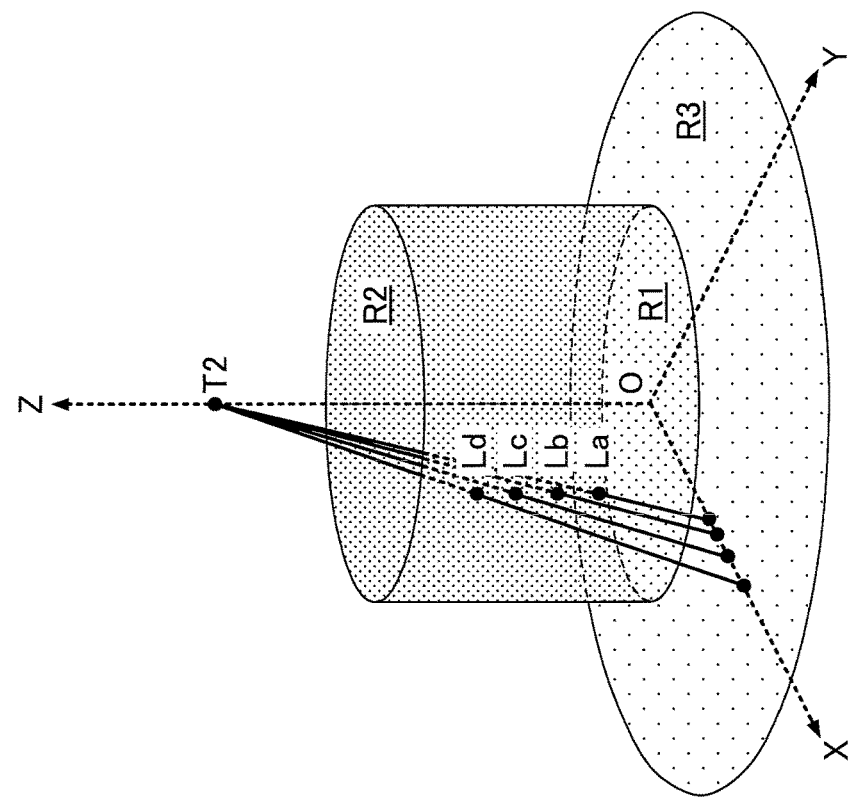
FIG. 8A is an illustration of a case where all auxiliary lines positioned on the XZ-plane extend from a start point on the Z-axis toward the processing-target image plane.
Figure 8B:
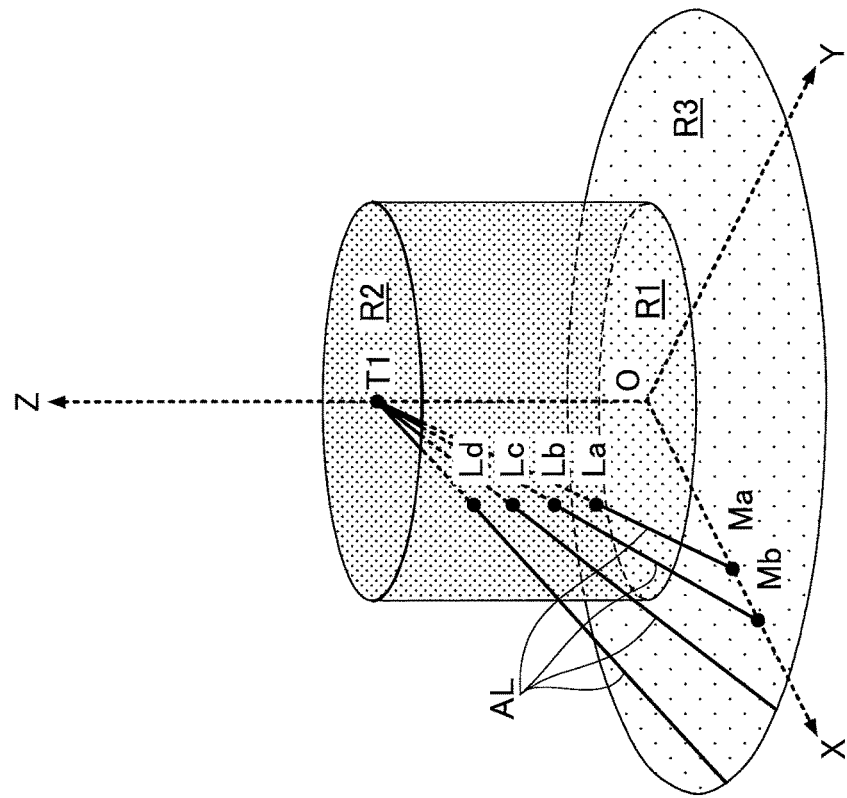
FIG. 8B is an illustration of a case where all auxiliary lines positioned on the XZ-plane extend from a different start point on the Z-axis toward the processing-target image plane.

Next, a description is given, with reference to FIGS. 8A and 8B, of an alternative example of the parallel lines PL, which the coordinates-associating part 10 introduces to associate coordinates on the space model MD with coordinates on the processing-target image plane R3.

FIG. 8A is a diagram of a case where all of auxiliary lines AL as re-projection lines positioned on the XZ-plane extend from a start point T1 on the Z-axis toward the processing-target image plane R3. On the other hand, FIG. 8B is a diagram of a case where all of the auxiliary lines AL extend from a start point T2 (T2>T1) on the Z-axis toward the processing-target image plane R3. Also, coordinates La~Ld on the curved surface area R2 of the space model MD in FIGS. 8A and 8B correspond to coordinates Ma~Md on the processing-target image plane R3, respectively. In the example in FIG. 8A, coordinates Mc and Md are not shown because they are out of range of the processing-target image plane R3. Also, intervals of the coordinates La~Ld in FIG. 8A are equal to intervals of the coordinates La~Ld in FIG. 8B, respectively. Although it is assumed that the auxiliary lines AL are supposed to be on the XZ-plane for the purpose of simplification of description, actually, the auxiliary lines AL radially extend from an arbitrary point on the Z-axis toward the processing-target image plane R3. Similar to the example illustrated in FIGS. 7A and 7B, the Z-axis in this case is referred to as "re-projection axis".

As illustrated in FIGS. 8A and 8B, the intervals of the coordinates Ma~Md on the processing-target image plane R3 decease nonlinearly with increase in a distance (height) between the start point of the auxiliary lines AL and the origin O. That is, a degree of decrease of each interval increases with increase in a distance between the curved surface area R2 of the space model MD and each of the coordinates Ma~Md. On the other hand, in the example illustrated in FIGS. 8A and 8B, coordinates on the flat surface area R1 of the space model MD are not converted to coordinates on the processing-target image plane R3. Thus, the intervals of the coordinates on the flat surface area R1 of the space model MD do not change.

Similar to the case of the parallel lines PL, the change in these intervals of the coordinates means that only an image part corresponding to the image projected on the curved surface area R2 of the space model MD, out of image parts on the output image plane R5 (refer to FIG. 6C), is enlarged or reduced nonlinearly.

In this way, the image creating device 100 can linearly or nonlinearly enlarge or reduce an image part (for example, a horizontal image) of the output image corresponding to an image projected on the curved surface area R2 of the space model MD without affecting an image part (for example, a road surface image) of the output image corresponding to an image projected on the flat surface area R1 of the space model MD. Thereby, the image creating device 100 can rapidly and flexibly enlarge or reduce an object positioned around the shovel 60 (an object in an image of surroundings in a horizontal direction viewed from the shovel 60) without affecting a road surface image (a virtual image of the shovel 60 viewed from directly above) in the vicinity of the shovel 60, and can improve visibility of a blind area created by the shovel 60.

Next, a description will be given, with reference to FIG. 9, of a process in which the image creating device 100 creates a processing-target image (hereinafter, referred to as "processing-target image creating process") and a process in which the image creating device 100 creates an output image using the created processing-target image (hereinafter, referred to as "output image creating process"). FIG. 9 is a flowchart of the processing-target creating process (step S1~step S3) and the output image creating process (step S4~step S6). Also, the arrangement of the camera 2 (the input image plane R4), the space model (the flat surface area R1 and the curved surface area R2) and the processing-target image plane R3 is preconfigured.

First, the coordinates-associating part 10 in the control part 1 associates coordinates on the processing-target image plane R3 with coordinates on the space model MD (step S1).

Specifically, the coordinates-associating part 10 acquires an angle formed between the parallel lines PL and the processing-target image plane R3. Then the coordinates-associating part 10 computes a point at which one of the parallel lines PL extending from a coordinate on the processing-target image plane R3 intersects with the curved surface area R2 of the space model MD. Then, the coordinates-associating part 10 derives a coordinate on the curved surface area R2 corresponding to the computed point as a coordinate on the curved surface area R2 corresponding to the very coordinate on the processing-target image plane R3, and stores its correspondence relationship into the space model/processing-target image correspondence map 41. The angle formed between the parallel lines PL and the processing-target image plane R3 may be a value previously stored in the storage part 4, etc., or may be a value dynamically input by an operator through the input part 3.

When a coordinate on the processing-target image plane R3 coincides with a coordinate on the flat surface area R1 on the space model MD, the coordinates-associating part 10 derives the coordinate on the flat surface area R1 as a coordinate corresponding to the coordinate on the processing-target image plane R3, and stores its correspondence relationship into the space model/processing-target image correspondence map 41.

Thereafter, the coordinates-associating part 10 in the control part 1 associates the coordinate on the space model MD derived by the above mentioned process with a coordinate on the input image plane R4 (step S2).

Specifically, the coordinates-associating part 10 acquires a coordinate of the optical center C of the camera 2 using a normal projection (h=f tan α). Then, the coordinates-associating part 10 computes a point at which a line segment, which extends from a coordinate on the space model MD and passes through the optical center C, intersects with the input image plane R4. Then, the coordinates-associating part 10 derives a coordinate on the input image plane R4 corresponding to the computed point as a coordinate on the input image plane R4 corresponding to the coordinate on the space model MD, and stores its correspondence relationship into the input image/space model correspondence map 40.

Thereafter, the control part 1 determines whether or not the control part 1 has associated all coordinates on the processing-target image plane R3 with coordinates on the space model MD and coordinates on the input image plane R4 (step S3). Then, if the control part 1 has determined that it has not yet associated all coordinates (NO at step S3), the control part 1 repeats the process of step S1 and step S2.

On the other hand, if the control part 1 has determined that it has associated all coordinates (YES at step S3), the control part 1 terminates the processing-target image creating process, and then, starts the output image creating process. Then, the image creating part 11 in the control part 1 associates coordinates on the processing-target image plane R3 with coordinates on the output image plane R5 (step S4).

Specifically, the image creating part 11 creates an output image by applying a scale conversion, an affine conversion or a distortion conversion to a processing-target image. Then, the image creating part 11 stores a correspondence relationship between the coordinates on the processing-target image plane R3 and the coordinates on the output image plane R5 into the processing-target image/output image correspondence map 42. The correspondence relationship is set depending on the details of the applied scale conversion, affine conversion, or distortion conversion.

Alternatively, when the image creating part 11 creates an output image by using the virtual camera 2V, the image creating part 11 may compute coordinates on the output image plane R5 from coordinates on the processing-target image plane R3 depending on the adopted projection system, and may store its correspondence relationship into the processing-target image/output image correspondence map 42.

Alternatively, when the image creating part 11 creates an output image by using the virtual camera 2V using a normal projection (h=f tan α), the image creating part 11 acquires a coordinate of the optical center CV of the virtual camera 2V. Then, the image creating part 11 computes a point at which a line segment, which extends from a coordinate on the output image plane R5 and passes through the optical center CV, intersects with the processing-target image plane R3. Then, the image creating part 11 derives a coordinate on the processing-target image plane R3 corresponding to the computed point as a coordinate on the processing-target image plane R3 corresponding to the coordinate on the output image plane R5. In this way, the image creating part 11 may store its correspondence relationship into the processing-target image/output image correspondence map 42.

Thereafter, the image creating part 11 in the control part 1 refers to the input image/space model correspondence map 40, the space model/processing-target image correspondence map 41 and the processing-target image/output image correspondence map 42. Then, the image creating part 11 follows the correspondence relationship between the coordinates on the input image plane R4 and the coordinates on the space model MD, the correspondence relationship between the coordinates on the space model MD and the coordinates on the processing-target image plane R3 and the correspondence relationship between the processing-target image plane R3 and the coordinates on the output image plane R5. Then, the image creating part 11 acquires values (for example, a brightness value, a color phase value, a chroma value, etc.) indicated by the coordinates on the input image plane R4 corresponding to each coordinate on the output image plane R5, and uses the acquired values as values of each coordinate on the corresponding output image plane R5 (step S5). If a plurality of coordinates on a plurality of input image planes R4 correspond to one coordinate on the output image plane R5, the image creating part 11 may derive a statistical value based on each value of the plurality of coordinates on the plurality of input image planes R4, and may use the statistical value as a value of the coordinate on the output image plane R5. The statistical value is, for example, a mean value, a maximum value, a minimum value, a median value, etc.

Thereafter, the control part 1 determines whether or not the control part 1 has associated values of all coordinates on the output image plane R5 with values of coordinates on the input image plane R4 (step S6). If the control part 1 has determined that it has not yet associated values of all coordinates (NO at step S6), the control part 1 repeats the process of step S4 and step S5.

On the other hand, if the control part 1 has determined that it has associated values of all coordinates (YES at step S6), the control part 1 creates an output image, and terminates series of processes.

If the image creating device 100 does not create a processing-target image, the image creating device 100 omits the processing-target image creating process. In this case, the "coordinates on the processing-target image plane" in step S4 of the output image creating process is substitutionally read as "coordinates on the space model".

According to the above-mentioned configuration, the image creating device 100 is capable of creating the processing-target image and the output image that can cause the operator to intuitively grasp the positional relationship between the shovel 60 and a peripheral object of the shovel 60.

Also, the image creating device 100 performs association of coordinates in such a way as to track back from the processing-target image plane R3 through the space model MD to the input image plane R4. Thereby, the image creating device 100 can surely associate each coordinate on the processing-target plane R3 with one or more coordinates on the input image plane R4. Thus, the image creating device 100 can create a better quality processing-target image rapidly in comparison to performing association of coordinates in an order from the input image plane R4 through the space model MD to the processing-target image plane R3. If the image creating device 100 performs association of coordinates in an order from the input image plane R4 through the space model MD to the processing-target image plane R3, the image creating device 100 is capable of surely associating each coordinate on the input image plane R4 with one or more coordinates on the processing-target image plane R3. However, there may be a case where a part of the coordinates on the processing-target image plane R3 cannot be associated with any one of the coordinates on the input image plane R4. In such a case, it is necessary to apply an interpolation process or the like to the part of the coordinates on the processing-target image plane R3.

Also, when the image creating device 100 enlarges or reduces only an image corresponding to the curved surface area R2 of the space model MD, the image creating device 100 can realize a desired enlargement or reduction by just rewriting only a part related to the curved surface area R2 in the space model/processing-target image correspondence map 41 by changing the angle formed between the parallel lines PL and the processing-target image plane R3, without rewriting the contents of the input image/space model correspondence map 40.

Also, when the image creating device 100 changes an appearance of an output image, the image creating device 100 is capable of creating a desired output image (a scale conversion image, an affine conversion image or a distortion conversion image) by just rewriting the processing-target image/output image correspondence map 42 by changing various parameters regarding a scale conversion, an affine conversion or a distortion conversion, without rewriting the contents of the input image/space model correspondence map 40 and the contents of the space model/processing-target image correspondence map 41.

Similarly, when the image creating device 100 changes a viewpoint of an output image, the image creating device 100 is capable of creating an output image (a viewpoint conversion image) viewed from a desired viewpoint by just rewriting the processing-target image/output image correspondence map 42 by changing values of various parameters of the virtual camera 2V, without rewriting the contents of the input image/space model correspondence map 40 and the space model/processing-target image correspondence map 41.

Figure 10:
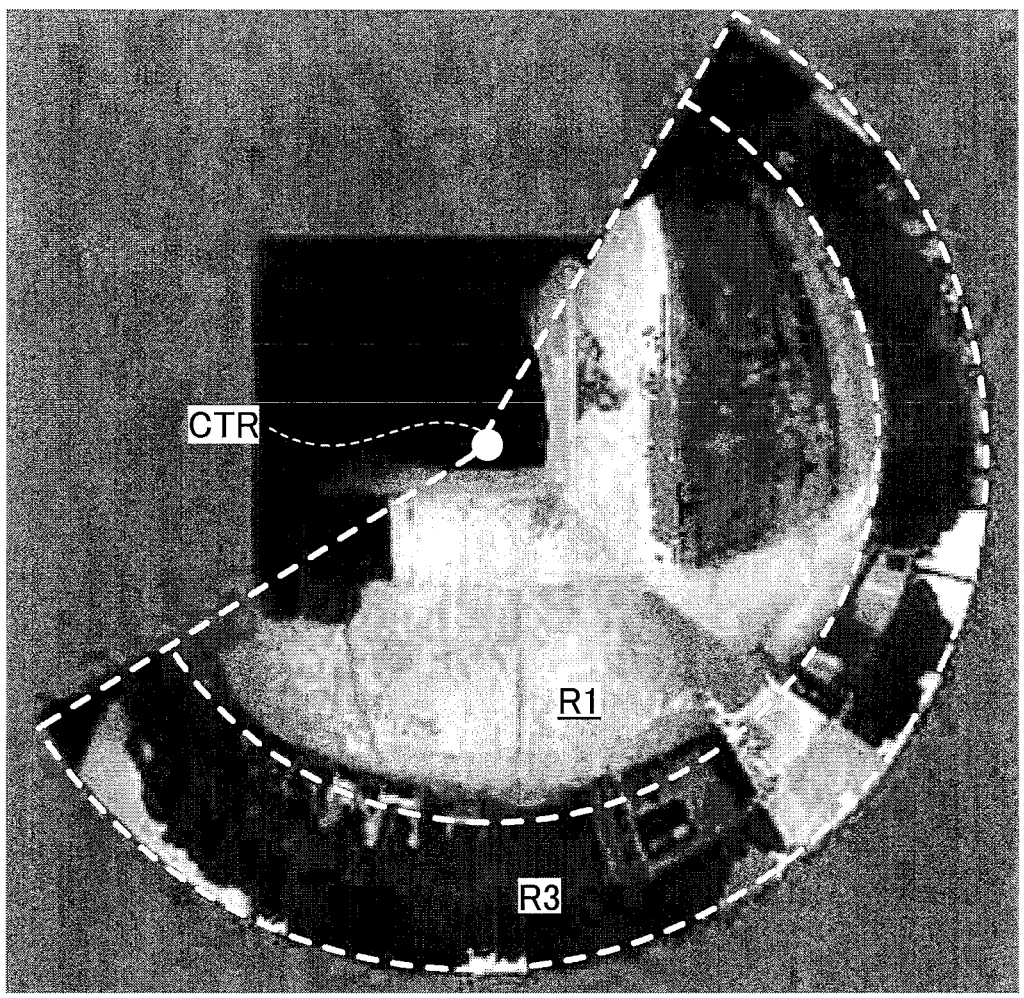
FIG. 10 is a photographic illustration of an output image.

FIG. 10 is an example of an output image created by using input images of two cameras 2 (the right camera 2R and the back camera 2B) mounted on the shovel 60 and displayed on the display part 5.

The image creating device 100 creates a processing-target image by projecting each of the input images of the two cameras 2 onto the flat surface area R1 and the curved surface area R2 of the space model MD, and thereafter re-projecting them onto the processing-target image plane R3. Then, the image creating device 100 creates an output image by applying an image conversion process (for example, a scale conversion process, an affine conversion process, a distortion conversion process, a view-point conversion process, etc.) to the created processing-target image. In this way, the image creating device 100 creates an output image that simultaneously displays an image of the vicinity of the shovel 60 viewed from above (an image on the flat surface area R1) and an image of surroundings in a horizontal direction viewed from the shovel 60 (an image on the processing-target image plane R3). Hereinafter, such an output image is referred to as a perimeter-monitoring virtual viewpoint image.

When the image creating device 100 does not create a processing-target image, the perimeter-monitoring virtual viewpoint image is created by applying an image conversion process (for example, a viewpoint conversion process) to the image projected on the space model MD.

Also, the perimeter-monitoring virtual viewpoint image is trimmed in a circular shape so as to display an image naturally when the shovel 60 performs a turning operation, and is created so that the center CTR of the circle lies on the cylinder center axis of the space model MD and on the turning axis PV of the shovel 60. Thus, the perimeter-monitoring virtual viewpoint image is displayed so as to rotate about the center CTR as an axis in response to the turning operation of the shovel 60. In this case, the cylinder center axis of the space model MD may coincide with the re-projection axis or may not coincide with the re-projection axis.

It should be noted that a radius of the space model MD is, for example, 5 meters. Also, an angle formed between the parallel lines PL and the processing-target image plane R3 or a start point height of the auxiliary lines AL can be set so that, when an object (for example, a worker) is present at a position away from the turning center of the shovel 60 by a maximum reach distance (for example, 12 meters), the object is displayed sufficiently large (for example, larger than or equal to 7 millimeters) on the display part 5.

Further, in the perimeter-monitoring virtual viewpoint image, a CG image of the shovel 60 may be arranged so that the forward direction of the shovel 60 coincides with the upward direction of the screen of the display part 5 and the turning center thereof coincides with the center CTR. This is to make the positional relationship between the shovel 60 and the object appearing in the output image easily recognizable. It should be noted that a frame image including various information such as an orientation may be arranged around the perimeter-monitoring virtual viewpoint image.

Next, a description is given, with reference to FIGS. 11~14B, of details of the perimeter-monitoring virtual viewpoint image created by the image creating device 100.

Figure 11:
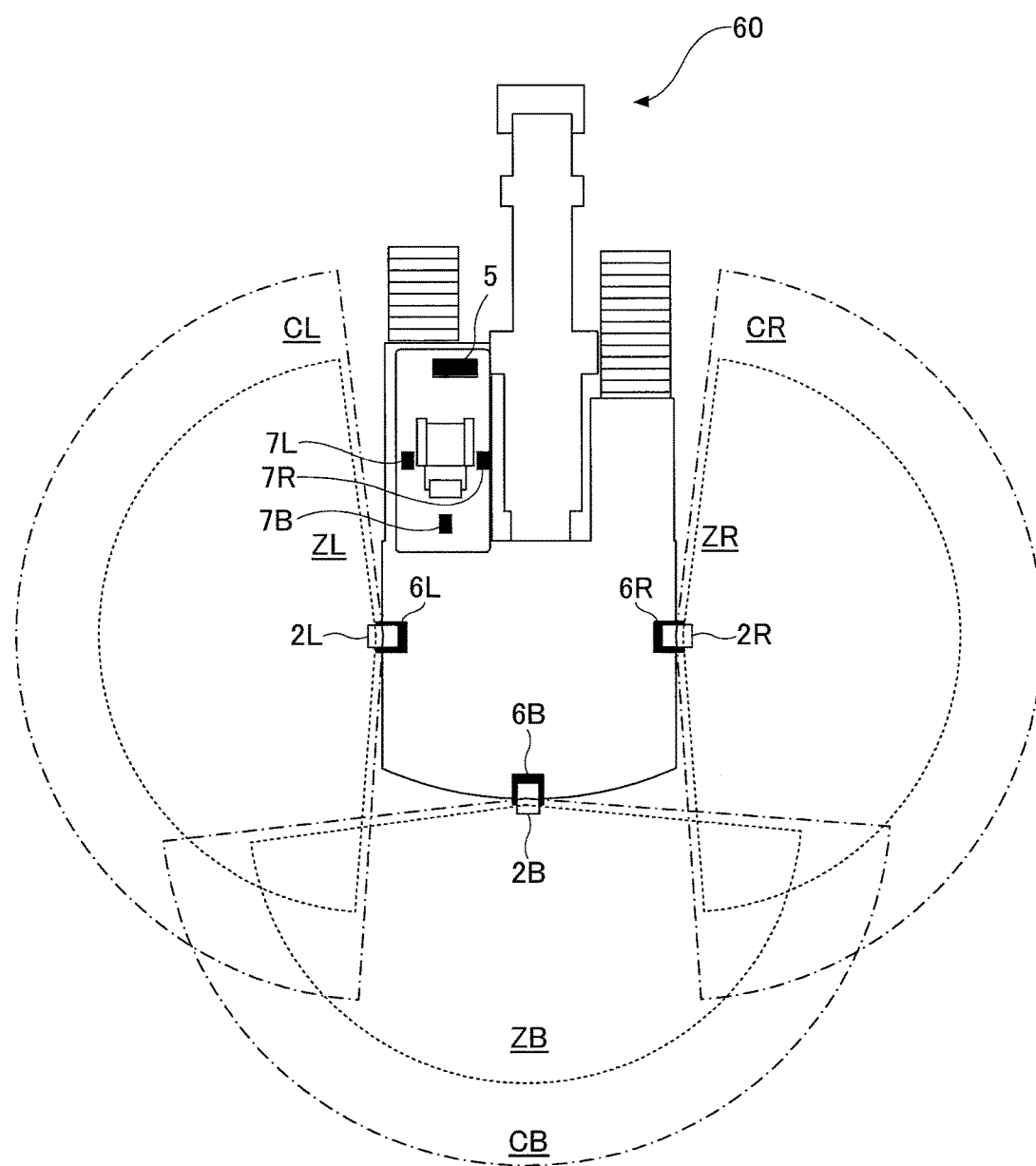
FIG. 11 is a plan view of a shovel equipped with an image creating device having three cameras and three human detection sensors.

FIG. 11 is a plan view of the shovel 60 equipped with the image creating device 100. In the embodiment illustrated in FIG. 11, the shovel 60 is equipped with three cameras 2 (a left camera 2L, a right camera 2R and a back camera 2B) and three human detection sensors 6 (a left human detection sensor 6L, a right human detection sensor 6R and a back human detection sensor 6B). Hereinafter, the left camera 2L, the right camera 2R and the back camera 2B may be collectively referred to as a camera 2. Also, the left human detection sensor 6L, the right human detection sensor 6R and the back human detection sensor 6B may be collectively referred to as a human detection sensor 6. Spaces CL, CR, CB indicated by dashed dotted lines in FIG. 11 illustrate imaging spaces of the left camera 2L, the right camera 2R and the back camera 2B, respectively. Also, spaces ZL, ZR and ZB indicated by dotted lines in FIG. 11 indicate monitoring spaces of a left human detection sensor 6L, a right human detection sensor 6L and a back human detection sensor 6B, respectively. Also, shovel 60 is provided with the display part 5 and three alarm output parts 7 (a left alarm output part 7L, a right alarm output part 7R and a back alarm output part 7B) in the cab 64.

Although the monitoring spaces of the human detection sensors 6 are narrower than the imaging spaces of the cameras 2 in the present embodiment, the monitoring spaces of the human detection sensors 6 may be identical to the imaging spaces of the cameras 2, or may be wider than the imaging spaces of the cameras 2. Also, although the monitoring spaces of the human detection sensors 6 are located in the vicinity of the shovel 60 within the imaging spaces of the cameras 2, they may be in an area farther from the shovel 60. Also, the monitoring spaces of the human detection sensor 6 have an overlapping part in the overlapping part of the imaging spaces of the cameras 2. For example, in the overlapping part of the imaging space CR of the right camera 2R and the imaging space CB of the back camera 2B, the monitoring space ZR of the right human detection sensor 6R overlaps with the monitoring space ZB of the back human detection sensor 6B. However, the monitoring spaces of the human detection sensors 6 may be arranged so as not to cause an overlap.

FIGS. 12A~12D are photographic illustrations of respective input images of the three cameras 2 mounted on the shovel 60 and an output image created by using those input images.

The image creating device 100 creates a processing-target image by projecting the input images of the respective three cameras 2 onto the flat surface area R1 and the curved surface area R2 of the space model MD, and then by re-projecting them onto a processing-target image plane R3. Also, the image creating device 100 creates an output image by applying an image conversion process (for example, a scale conversion process, an affine conversion process, a distortion conversion process, a viewpoint conversion process, etc.) to the created processing-target image. As a result, the image creating device 100 creates a perimeter-monitoring virtual viewpoint image that simultaneously displays an image of the vicinity of the shovel 60 viewed from above (an image on the flat surface area R1) and an image of surroundings in a horizontal direction viewed from the shovel 60 (an image on the processing-target image plane R3). The image displayed in the center of the perimeter-monitoring virtual viewpoint image is a CG image 60CG of the shovel 60.

The input image of the right camera 2R illustrated in FIG. 12C and the input image of the back camera 2B illustrated in FIG. 12D capture a human within an overlapping part of the imaging spaces of the right camera 2R and the back camera 2B (refer to an area R10 encircled by a dashed two-dotted line in the input image of the right camera 2R and an area R11 encircled by a dashed two-dotted line in the input image of the back camera 2B), respectively.

However, if coordinates on the output image plane are associated with coordinates on the input image plane relating to a camera having a smallest incident angle, the output image causes the human in the overlapping part to disappear (refer to an area R12 encircled by a dashed dotted line in the output image).

Thus, the image creating device 100 mixes the area with which coordinates on the input image plane of the back camera 2B are associated and the area with which coordinates on the input image plane of the right camera 2R are associated, in an output image portion corresponding to the overlapping part so as to prevent an object in the overlapping part from disappearing.

FIGS. 13A~13C are diagrams illustrating a striped pattern process as an example of an image disappear preventing process for preventing an object in the overlapping part of each of imaging spaces of two cameras 2 from disappearing.

FIG. 13A is a diagram illustrating an output image portion corresponding to the overlapping part of the imaging space of the right camera 2R and the imaging space of the back camera 2B, which corresponds to a square area R13 indicated by dashed lines in FIG. 12A.

Also, in FIG. 13A, an area PR1 painted in gray is an image area on which an input image portion of the back camera 2B is arranged, and each coordinate on the output image plane corresponding to the area PR1 is associated with a coordinate on the input image plane of the back camera 2B.

On the other hand, an area PR2 painted in white is an image area on which an input image portion of the right camera 2R is arranged, and each coordinate on the output image plane corresponding to the area PR2 is associated with a coordinate on the input image plane of the right camera 2R.

In the present embodiment, the area PR1 and the area PR2 are arranged to form a striped pattern (striped pattern process), and boundary lines between the area PR1 and the area PR2 alternately arranged in the striped pattern are defined by concentric circles on a horizontal plane having the center coincides with the turning center of the shovel 60.

FIG. 13B is a plan view illustrating a state of a space area located diagonally backward right of the shovel 60, which illustrates the present state of the space area captured by both the back camera 2B and the right camera 2R. FIG. 13B also illustrates that there exists a rod-like solid object OB diagonally backward right of the shovel 60.

FIG. 13C illustrates a portion of the output image created based on the input images acquired by actually capturing the space area illustrated in FIG. 13B by the back camera 2B and the right camera 2R.

Specifically, an image OB1 represents an image of the solid object OB in the input image of the back camera 2B, which is elongated in an extending direction of a line joining the back camera 2B and the solid object OB, by a viewpoint conversion for creating a road surface image. That is, the image OB1 is a portion of the image of the solid object OB, which is displayed when a road surface image in the output image portion is created by using the input image of the back camera 2B.

Also, an image OB2 represents the image of the solid object OB in the input image of the right camera 2R, which is elongated in an extending direction of a line joining the right camera 2R and the solid object OB, by a viewpoint conversion for creating a road surface image. That is, the image OB2 is a portion of the image of the solid object OB, which is displayed when a road surface image in the output image portion is created by using the input image of the right camera 2R.

In this way, the image creating device 100 mixes in the overlapping part the area PR1 with which coordinates on the input image plane of the back camera 2B are associated and the area PR2 with which coordinates on the input image plane of the right camera 2R are associated. As a result, the image creating device 100 displays both of the two images OB1 and OB2 relating to the solid object OB on the output image, and prevents the object OB from disappearing from the output image.

Figure 14A:
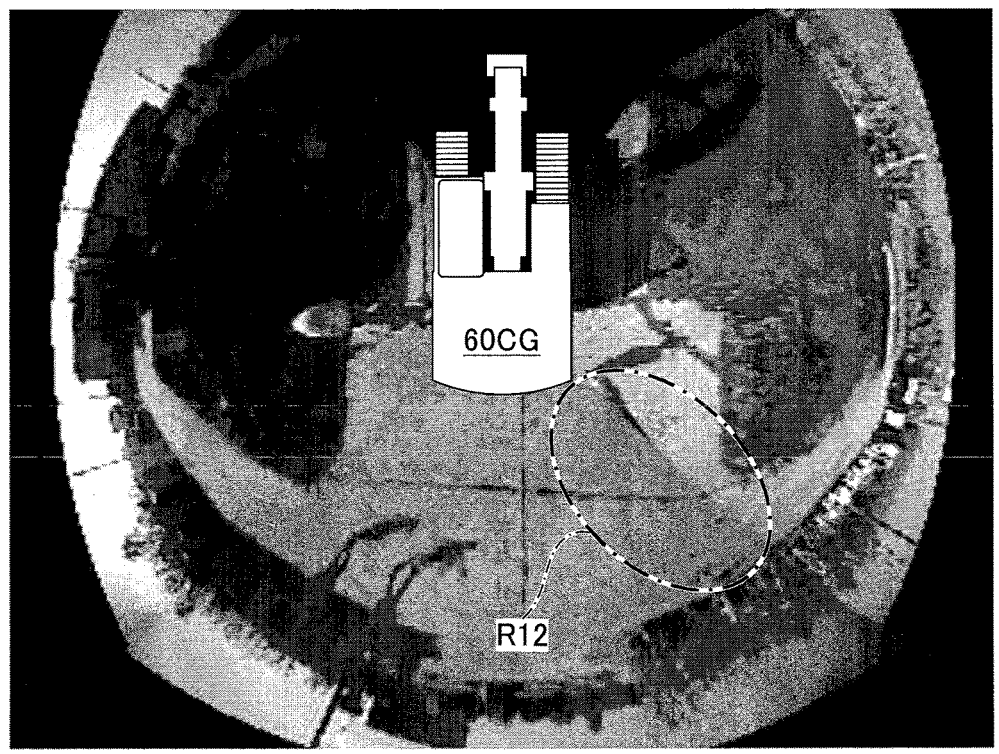
FIG. 14A is an enlarged photographic illustration of the output image illustrated in FIG. 12A.
Figure 14B:
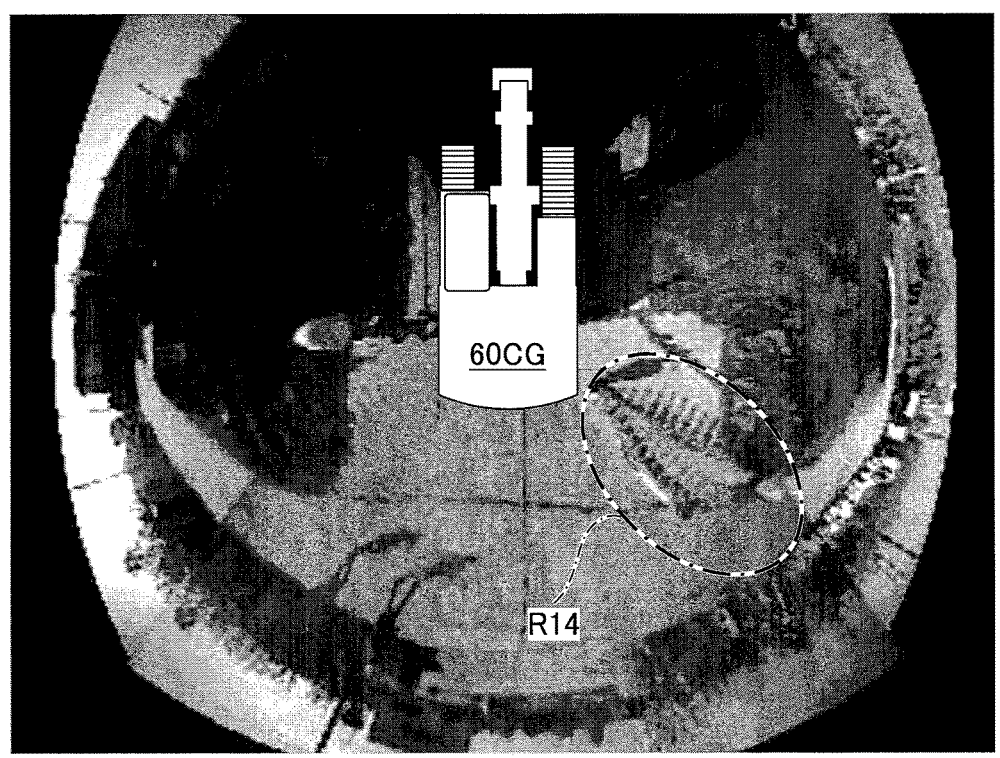
FIG. 14B is a photographic illustration of an output image obtained by applying an image disappearance preventing process to the output image of FIG. 14A.
Figure 17A:
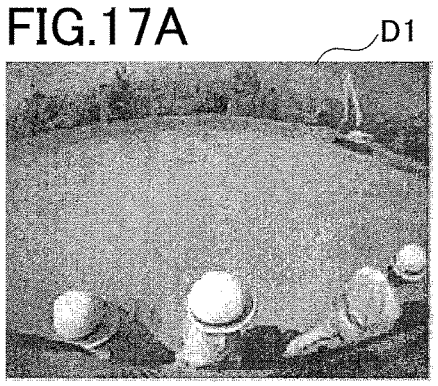
FIG. 17A is a photographic illustration of an output image.
Figure 17B:
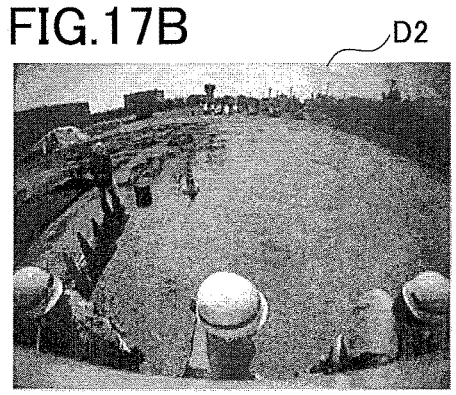
FIG. 17B is a photographic illustration of an output image.
Figure 17C:
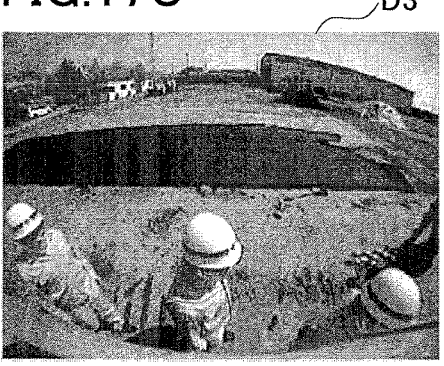
FIG. 17C is a photographic illustration of an output image.
Figure 17D:
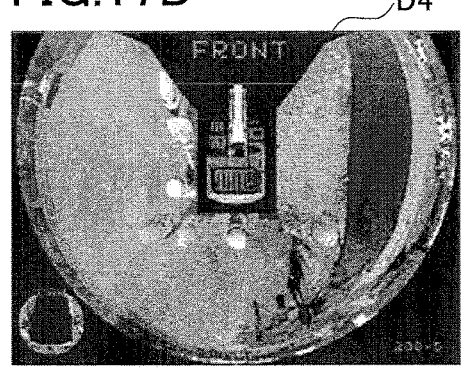
FIG. 17D is a photographic illustration of an output image.
Figure 17E:
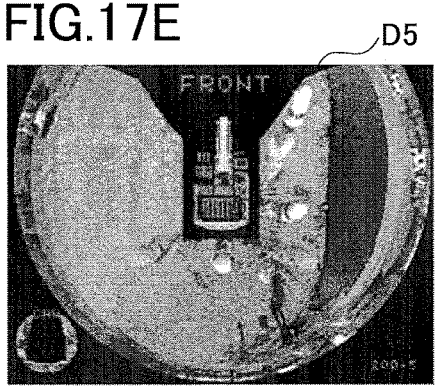
FIG. 17E is a photographic illustration of an output image.
Figure 17F:
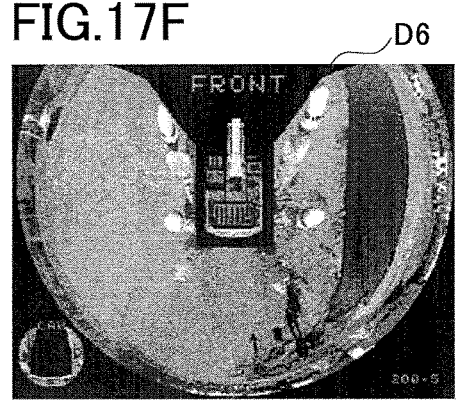
FIG. 17F is a photographic illustration of an output image.
Figure 17G:
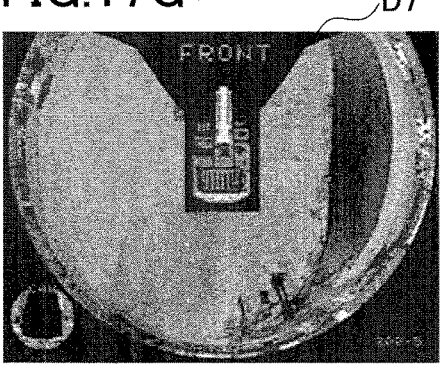
FIG. 17G is a photographic illustration of an output image.

FIG. 14A is an enlarged photographic illustration of the output image of FIG. 12A. FIG. 14B is a photographic illustration of an output image obtained by applying the image disappear preventing process (the striped pattern process) to the output image of FIG. 12A. A human disappears in an area R12 encircled by a dashed dotted line in FIG. 14A while the human is displayed without disappearing in an area R14 encircled by a dashed dotted line in FIG. 14B.

The image creating device 100 may prevent an object in the overlapping part from disappearing by applying a meshed pattern process, an averaging process, or the like, instead of the striped pattern process. Specifically, by applying the averaging process, the image creating device 100 adopts an average value of values (for example, brightness values) of corresponding pixels in input images of each of two cameras as a value of a pixel in an output image portion corresponding to the overlapping part. Alternatively, by applying the meshed pattern process, the image creating device 100 allocates an area with which values of pixels in an input image of one camera are associated and an area with which values of pixels in an input image of the other camera are associated so that these areas may form a net-like pattern (a meshed pattern) in the output image portion corresponding to the overlapping part. Thereby the image creating device 100 prevents an object within the overlapping part from disappearing.

Next, referring to FIGS. 15A~17G, a process in which the image creating part 11 determines an input image(s) used for creating an output image out of a plurality of input images based on a determination result by the human presence determining part 12 (hereinafter, referred to as "first input image determining process") will be described. FIGS. 15A~15D are photographic illustrations of respective input images of the three cameras 2 mounted on the shovel 60 and an output image created by using those input images, and correspond to FIGS. 12A~12D. Also, FIG. 16 is a correspondence table indicating a correspondence relationship between a determination result by the human presence determining part 12 and an input image(s) used for creating an output image. Also, FIGS. 17A through 17G are photographic illustrations of output images created based on an input image(s) determined at the first input image determining process.

As shown in FIGS. 15A~15D, the image creating device 100 creates a processing-target image by projecting respective input images of three cameras 2 onto the flat surface area R1 and the curved surface area R2 of the space model MD and then re-projecting them onto the processing-target image plane R3. Also, the image creating device 100 creates an output image by applying an image conversion process (for example, a scale conversion process, an affine conversion process, a distortion conversion process, a viewpoint conversion process, etc.) to the created processing-target image. As a result, the image creating device 100 creates a perimeter-monitoring virtual viewpoint image that simultaneously displays an image of the vicinity of the shovel 60 viewed from above and an image of surroundings viewed from the shovel 60 in a horizontal direction.

Also, in FIGS. 15B~15D, input images of the left camera 2L, the back camera 2B, and the right camera 2R show a situation where three workers exist, respectively. Also, in FIG. 15A, the output image shows a situation where nine workers exist around the shovel 60.

Now, referring to the correspondence table in FIG. 16, the correspondence relationship between a determination result by the human presence determining part 12 and an input image(s) used for creating an output image will be described. "o" represents that the human presence determining part 12 has determined that a human exists, and "x" represents that the human presence determining part 12 has determined that a human does not exist.

A pattern 1 shows that an output image is created by using the input image of the left camera 2L when it is determined that a human exists only in the left monitoring space ZR and determined that a human does not exist in the back monitoring space ZB and the right monitoring space ZR. This pattern 1 is adopted, for example, when a worker (three workers in this example) exists only on the left of the shovel 60. As shown in the output image D1 in FIG. 17A, the image creating part 11 outputs as an output image the input image of the left camera 2L, which has captured three workers, without any change. Hereinafter, an output image, which is created by using an input image as it is, is referred to as "through-image".

A pattern 2 shows that an output image is created by using the input image of the back camera 2B when it is determined that a human exists only in the back monitoring space ZB and determined that a human does not exist in the left monitoring space ZL and the right monitoring space ZR. This pattern 2 is adopted, for example, when a worker (three workers in this example) exists only on the back of the shovel 60. As shown in the output image D2 in FIG. 17B, the image creating part 11 outputs as an output image the input image of the back camera 2B, which has captured three workers, without any change.

A pattern 3 shows that an output image is created by using the input image of the right camera 2R when it is determined that a human exists only in the right monitoring space ZR and determined that a human does not exist in the left monitoring space ZL and the back monitoring space ZB. This pattern 3 is adopted, for example, when a worker (three workers in this example) exists only on the right of the shovel 60. As shown in the output image D3 in FIG. 17C, the image creating part 11 outputs as an output image the input image of the right camera 2R, which has captured three workers, without any change.

A pattern 4 shows that an output image is created by using all three input images when it is determined that a human exists in the left monitoring space ZL and the back monitoring space ZB and determined that a human does not exist in the right monitoring space ZR. This pattern 4 is adopted, for example, when a worker (three workers each, six workers in total in this example) exists on the left and the back of the shovel 60. As shown in the output image D4 in FIG. 17D, the image creating part 11 outputs as an output image the perimeter-monitoring virtual viewpoint image which is created based on three input images and has captured six workers.

A pattern 5 shows that an output image is created by using all three input images when it is determined that a human exists in the back monitoring space ZB and the right monitoring space ZR and determined that a human does not exist in the left monitoring space ZL. This pattern 5 is adopted, for example, when a worker (three workers each, six workers in total in this example) exists on the back and the right of the shovel 60. As shown in the output image D5 in FIG. 17E, the image creating part 11 outputs as an output image the perimeter-monitoring virtual viewpoint image which is created based on three input images and has captured six workers.

A pattern 6 shows that an output image is created by using all three input images when it is determined that a human exists in the left monitoring space ZL and the right monitoring space ZR and determined that a human does not exist in the back monitoring space ZB. This pattern 6 is adopted, for example, when a worker (three workers each, six workers in total in this example) exists on the left and the right of the shovel 60. As shown in the output image D6 in FIG. 17F, the image creating part 11 outputs as an output image the perimeter-monitoring virtual viewpoint image which is created based on three input images and has captured six workers.

A pattern 7 shows that an output image is created by using all three input images when it is determined that a human exists in all of the left monitoring space ZL, the back monitoring space ZB and the right monitoring space ZR. This pattern 7 is adopted, for example, when a worker (three workers each, nine workers in total in this example) exists on the left, the back and the right of the shovel 60. As shown in the output image in FIG. 15A, the image creating part 11 outputs as an output image the perimeter-monitoring virtual viewpoint image which is created based on three input images and has captured nine workers.

A pattern 8 shows that an output image is created by using all three input images when it is determined that a human does not exist in all of the left monitoring space ZL, the back monitoring space ZB and the right monitoring space ZR. This pattern 8 is adopted, for example, when a worker does not exist on the left, the back and the right of the shovel 60. As shown in the output image D7 in FIG. 17G, the image creating part 11 outputs as an output image the perimeter-monitoring virtual viewpoint image which is created based on three input images and shows a situation where there is no worker around.

As presented above, the image creating part 11 outputs as an output image a through-image of a corresponding camera when it is determined that a human exists only in one of the three monitoring spaces. This is to display the human existing in the monitoring space on the display part 5 as large as possible. Also, the image creating part 11 outputs a perimeter-monitoring virtual viewpoint image without outputting a through-image when it is determined that a worker(s) exists in two or more of the three monitoring spaces. This is because it cannot display all workers existing around the shovel 60 on the display part 5 when it has used only one through-image, and because it can display all workers existing around the shovel 60 on the display part 5 when it outputs the perimeter-monitoring virtual viewpoint image. Moreover, the image creating part 11 outputs a perimeter-monitoring virtual viewpoint image without outputting a through-image when it is determined that a human does not exist in any of the three monitoring spaces. This is because there is no human to be displayed in an enlarged manner, and this is to allow objects other than a human existing around the shovel 60 to be widely monitored.

Also, the image creating part 11 may display a text message which makes it clear which input image has been used, when it displays a through-image.

Figure 18:
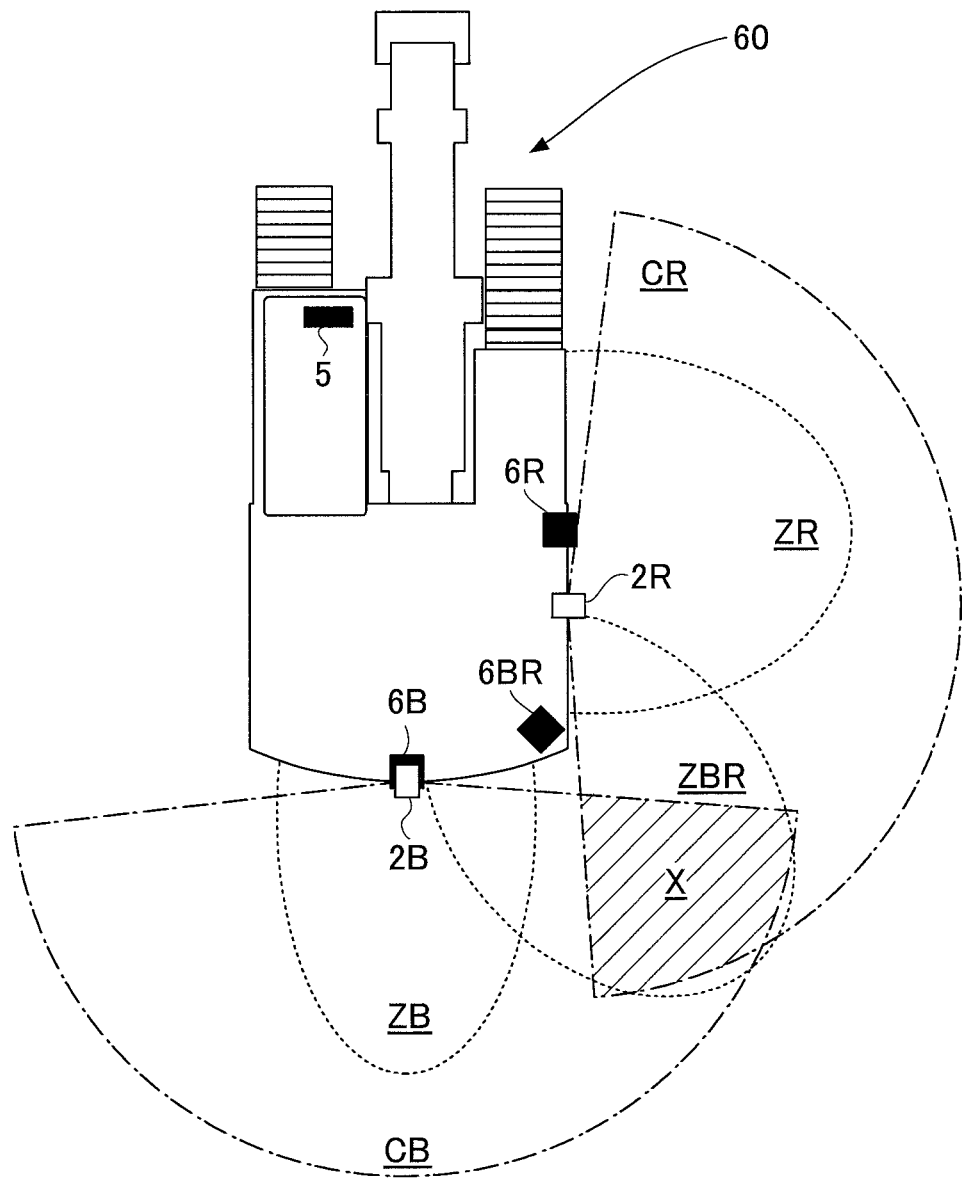
FIG. 18 is a plan view of a shovel equipped with an image creating device having two cameras and three human detection sensors.
Figure 20A:
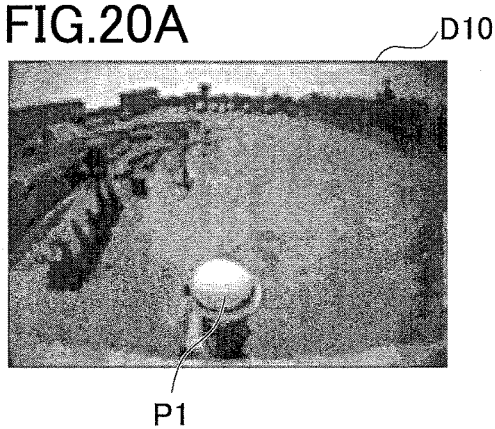
FIG. 20A is a photographic illustration of an output image.
Figure 20B:
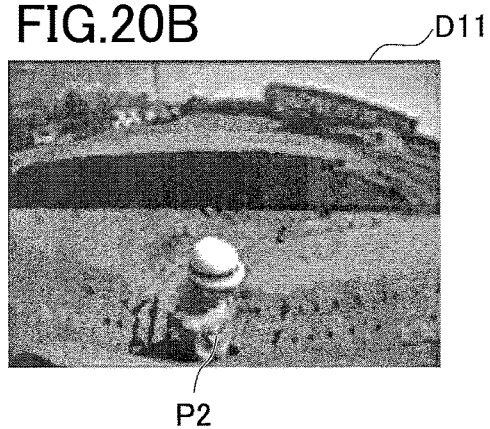
FIG. 20B is a photographic illustration of an output image.
Figure 20C:
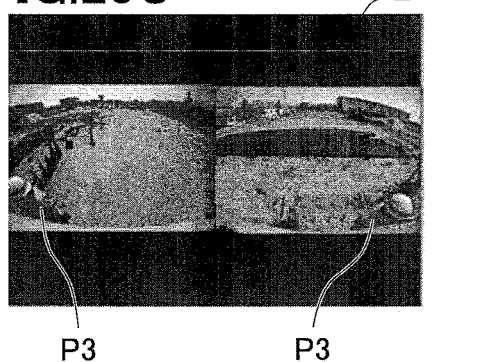
FIG. 20C is a photographic illustration of an output image.
Figure 20D:
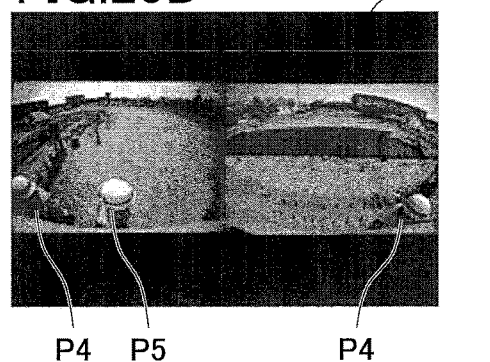
FIG. 20D is a photographic illustration of an output image.
Figure 20E:
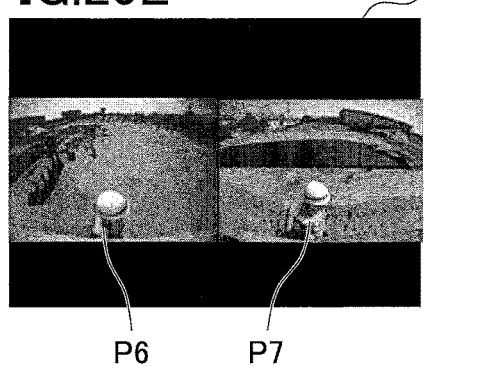
FIG. 20E is a photographic illustration of an output image.
Figure 20F:
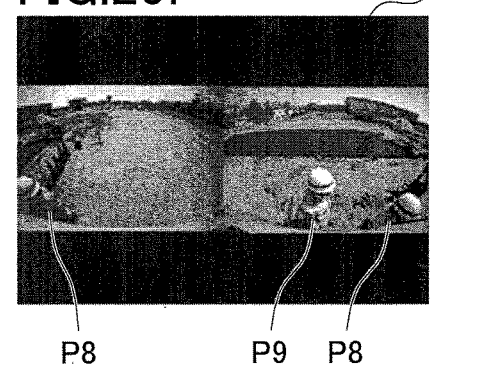
FIG. 20F is a photographic illustration of an output image.
Figure 20G:
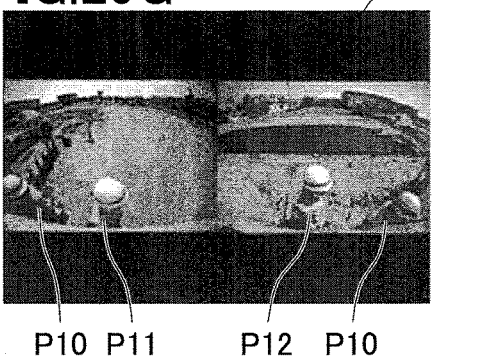
FIG. 20G is a photographic illustration of an output image.
Figure 21B:
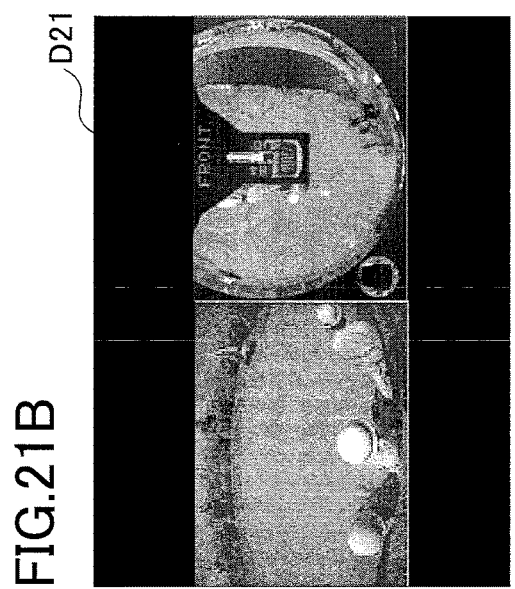
FIG. 21B is a photographic illustration of an output image.
Figure 21D:
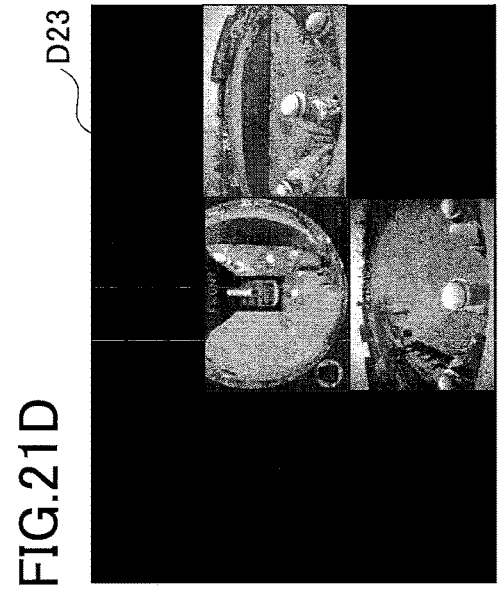
FIG. 21D is a photographic illustration of an output image.
Figure 21A:
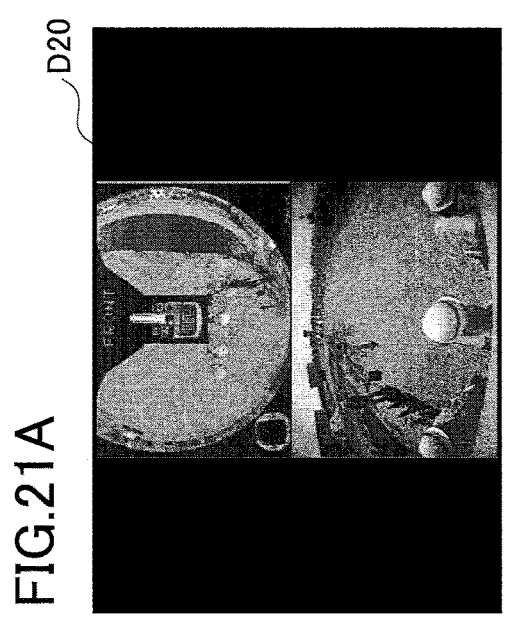
FIG. 21A is a photographic illustration of an output image.
Figure 21C:
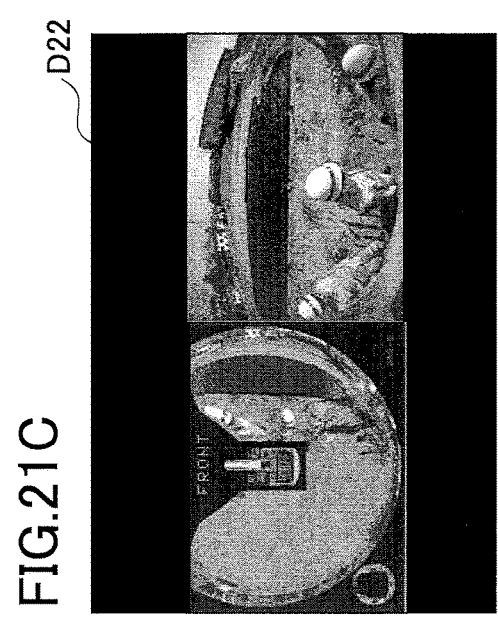
FIG. 21C is a photographic illustration of an output image.

Next, referring to FIGS. 18-20G, another example of a process in which the image creating part 11 determines an input image(s) used for creating an output image out of a plurality of input images based on a determination result by the human presence determining part 12 (hereinafter, referred to as "second input image determining process") will be described. FIG. 18 is a top view of a shovel 60 illustrating another arrangement example of the human detection sensors 6, and corresponds to FIG. 11. Also, FIG. 19 is a correspondence table indicating a correspondence relationship between a determination result by the human presence determining part 12 and an input image(s) used for creating an output image, and corresponds to FIG. 16. Also, FIGS. 20A~20G are photographic illustrations of output images created based on an input image(s) determined at the second input image determining process.

In the embodiment illustrated in FIG. 18, the shovel 60 is equipped with two cameras 2 (the right camera 2R and the back camera 2B) and three human detection sensors 6 (the right human detection sensor 6R, a back right human detection sensor 6BR, the back human detection sensor 6B). Areas CR, CB indicated by dashed dotted lines in FIG. 18 illustrate imaging spaces of the right camera 2R and the back camera 2B, respectively. Areas ZR, ZBR, and ZB indicated by dotted lines in FIG. 18 illustrate monitoring spaces of the right human detection sensor 6R, the back right human detection sensor 6BR and the back human detection sensor 6B, respectively. Also, an area X indicated by a diagonal hatching in FIG. 18 illustrates an overlapping part of the imaging space CR and the imaging space CB (Hereinafter, referred to as "overlapping imaging space X").

An arrangement example in FIG. 18 is different from the arrangement example in FIG. 11 in that the monitoring space ZR and the monitoring space ZBR do not have an overlapping part and in that it is equipped with the back right human detection sensor 6BR having the monitoring space ZBR including the overlapping imaging space X.

Due to this arrangement of the human detection sensors 6, the image creating device 100 can determine whether a human exists or not in the overlapping imaging space X. Then, the image creating device 100 uses the determination result to determine an input image(s) used for creating an output image so that it can switch contents of the output image more adequately.

Now, referring to a correspondence table in FIG. 19, a correspondence relationship between a determination result by the human presence detecting part 12 and an input image(s) for creating an output image will be described.

A pattern A shows that an output image is created by using the input images of the back camera 2B and the right camera 2R when it is determined that a human does not exist in all of the back monitoring space ZB, the back right monitoring space ZBR, and the right monitoring space ZR. This pattern A is adopted, for example, when a worker does not exist around the shovel 60. As shown in the output image D7 in FIG. 17G, the image creating part 11 creates a perimeter-monitoring virtual viewpoint image, which shows a situation where there is no worker around, based on the two input images and then output it.

A pattern B shows that an output image is created by using the input image of the back camera 2B when it is determined that a human exists only in the back monitoring space ZB and that a human does not exist in the back right monitoring space ZBR and the right monitoring space ZR. This pattern B is adopted, for example, when a worker P1 exists at the back of the shovel 60. As shown in the output image D10 in FIG. 20A, the image creating part 11 outputs as an output image the input image of the back camera 2B, which has captured the worker P1, without any change.

A pattern C shows that an output image is created by using the input image of the right camera 2R when it is determined that a human exists only in the right monitoring space ZR and that a human does not exist in the back monitoring space ZB and the back right monitoring space ZBR. This pattern C is adopted, for example, when a worker P2 exists at the right of the shovel 60. As shown in the output image D11 in FIG. 20B, the image creating part 11 outputs as an output image the input image of the right camera 2R, which has captured the worker P2, without any change.

A pattern D shows that an output image is created by using the input images of the back camera 2B and the right camera 2R when it is determined that a human exists only in the back right monitoring space ZBR and that a human does not exist in the back monitoring space ZB and the right monitoring space ZR. This pattern D is adopted, for example, when a worker P3 exists within the overlapping imaging space X at the back right of the shovel 60. As shown in the output image D12 in FIG. 20C, the image creating part 11 outputs as a first output image (left in the figure) the input image of the back camera 2B, which has captured the worker P3, without any change, and outputs as a second output image (right in the figure) the input image of the right camera 2R, which has captured the same worker P3, without any change.

A pattern E shows that an output image is created by using the input images of the back camera 2B and the right camera 2R when it is determined that a human exists in the back monitoring space ZB and the back right monitoring space ZBR and that a human does not exist in the right monitoring space ZR. This pattern E is adopted, for example, when a worker P4 exists at the back of the shovel 60 and when a worker P5 exists within the overlapping imaging space X at the back right of the shovel 60. As shown in the output image D13 in FIG. 20D, the image creating part 11 outputs as a first output image (left in the figure) the input image of the back camera 2B, which has captured the worker P4 and the worker P5, without any change, and outputs as a second output image (right in the figure) the input image of the right camera 2R, which has captured only the worker P4, without any change.

A pattern F shows that an output image is created by using the input images of the back camera 2B and the right camera 2R when it is determined that a human exists in the back monitoring space ZB and the right monitoring space ZR and that a human does not exist in the back right monitoring space ZBR. This pattern F is adopted, for example, when a worker P6 exists at the back of the shovel 60 and when another worker P7 exists at the right of the shovel 60. As shown in the output image D14 in FIG. 20E, the image creating part 11 outputs as a first output image (left in the figure) the input image of the back camera 2B, which has captured the worker P6, without any change, and outputs as a second output image (right in the figure) the input image of the right camera 2R, which has captured the worker P7, without any change.

A pattern G shows that an output image is created by using the input images of the back camera 2B and the right camera 2R when it is determined that a human exists in the back right monitoring space ZBR and the right monitoring space ZR and that a human does not exist in the back monitoring space ZB. This pattern G is adopted, for example, when a worker P8 exists within the overlapping imaging space X at the back right of the shovel 60 and when another worker P9 exists at the right of the shovel 60. As shown in the output image D15 in FIG. 20F, the image creating part 11 outputs as a first output image (left in the figure) the input image of the back camera 2B, which has captured the worker P8, without any change, and outputs as a second output image (right in the figure) the input image of the right camera 2R, which has captured the worker P8 and the worker P9, without any change.

A pattern H shows that an output image is created by using the input images of the back camera 2B and the right camera 2R when it is determined that a human exists in all of the back monitoring space ZB, the back right monitoring space ZBR and the right monitoring space ZR. This pattern H is adopted, for example, when a worker P10 exists within the overlapping imaging space X at the back right of the shovel 60, and when another worker P11 exists at the back of the shovel 60, and when yet another worker P12 exists at the right of the shovel 60. As shown in the output image D16 in FIG. 20G, the image creating part 11 outputs as a first output image (left in the figure) the input image of the back camera 2B, which has captured the worker P10 and the worker P11, without any change, and outputs as a second output image (right in the figure) the input image of the right camera 2R, which has captured the worker P10 and the worker P12, without any change.

In the second input image determining process, the image creating part 11 outputs as an output image a through-image of a corresponding camera when a human appears only in an input image of one camera. This is to display a human existing in a monitoring space on the display part 5 as large as possible. Also, the image creating part 11 outputs through-images of each of two cameras simultaneously and separately when a human appears in both of the input images of the two cameras. This is because it cannot display all workers existing around the shovel 60 on the display part 5 only with one through-image, and because outputting a perimeter-monitoring virtual viewpoint image makes it difficult to visually recognize a worker in comparison to outputting a through-image. Also, the image creating part 11 outputs a perimeter-monitoring virtual viewpoint image without outputting a through-image when it is determined that there is no human in any of three monitoring spaces. This is because there is no human to be displayed in an enlarged manner, and this is to allow objects other than a human existing around the shovel 60 to be widely monitored.

Also, similar to the case in the first input image determining process, the image creating part 11 may display a text message which makes it clear which input image has been used, when it displays a through-image.

Next, referring to FIGS. 21A~21D, other photographic illustrations of an output image created based on an input image(s) determined in the first input image determining process or the second input image determining process will be described.

As shown in FIGS. 21A~21D, the image creating part 11 may display a perimeter-monitoring virtual viewpoint image and a through-image concurrently. For example, as shown in the output image D20 in FIG. 21A, the image creating part 11 may display a perimeter-monitoring virtual viewpoint image as a first output image and a through-image of the back camera 2B as a second output image, when a worker(s) exists at the back of the shovel 60. In this case, the through-image is displayed at the lower side of the perimeter-monitoring virtual viewpoint image. This is to make an operator of the shovel 60 to recognize intuitively that a worker(s) is at the back of the shovel 60. Also, as shown in the output image D21 in FIG. 21B, the image creating part 11 may display a perimeter-monitoring virtual viewpoint image as a first output image and a through-image of the left camera 2L as a second output image, when a worker(s) exists at the left of the shovel 60. In this case, the through-image is displayed at the left of the perimeter-monitoring virtual viewpoint image. Similarly, as shown in the output image D22 in FIG. 21C, the image creating part 11 may display a perimeter-monitoring virtual viewpoint image as a first output image and a through-image of the right camera 2R as a second output image, when a worker(s) exists at the right of the shovel 60. In this case, the through-image is displayed at the right of the perimeter-monitoring virtual viewpoint image.

Alternatively, the image creating part 11 may display a perimeter-monitoring virtual viewpoint image and a plurality of through-images concurrently. For example, as shown in the output image D23 in FIG. 21D, the image creating part 11 may display a perimeter-monitoring virtual viewpoint image as a first output image, a through-image of the back camera 2B as a second output image, and a through-image of the right camera 2R as a third output image when a worker(s) exists at the back and at the right of the shovel 60. In this case, the through-image of the back camera 2B is displayed at the lower side of the perimeter-monitoring virtual viewpoint image, and the through-image of the right camera 2R is displayed at the right of the perimeter-monitoring virtual viewpoint image.

Also, the image creating part 11 may display a piece of information representing contents of an output image when it displays a plurality of output images at a time. For example, the image creating part 11 may display a text such as "back camera's through-image" or the like at the upper side of the through-image of the back camera 2B or at the periphery thereof.

Also, the image creating part 11 may popup one or more through-images on a perimeter-monitoring virtual viewpoint image, when it displays a plurality of output images at a time.

According to the above configuration, the image creating device 100 switches contents of an output image based on a determination result by the human presence determining part 12. Specifically, the image creating device 100 switches, for example, between a perimeter-monitoring virtual viewpoint image, which displays minified and modified contents of respective input images, and a through-image, which displays contents of each input image as it is. In this way, when the image creating device 100 has detected a worker around the shovel 60, by displaying a through-image, the image creating device 100 can more reliably prevent an operator of the shovel 60 from overlooking the worker in comparison to the case where it displays only a perimeter-monitoring virtual viewpoint image. This is because the worker is displayed in a large and comprehensible way.

Also, in the above embodiment, when the image creating part 11 creates an output image based on an input image of one camera, the image creating part 11 uses the through-image of the camera as the output image. However, the present invention is not limited to this configuration. For example, the image creating part 11 may create as an output image a back monitoring virtual viewpoint image based on an input image of the back camera 2B.

Also, in the above embodiment, the image creating device 100 associates one monitoring space of one human detection sensor with one imaging space of one camera. However, it may associate one monitoring space of one human detection sensor with a plurality of imaging spaces of a plurality of cameras, or may associate a plurality of monitoring spaces of a plurality of human detection sensors with one imaging space of one camera.

Also, in the above embodiment, the image creating device 100 causes monitoring spaces of two adjacent human detection sensors to partially overlap. However, the image creating device 100 may cause the monitoring spaces not to overlap. Also, the image creating device 100 may cause a monitoring space of one human detection sensor to be entirely included in a monitoring space of another human detection sensor.

Also, in the above embodiment, the image creating device 100 switches contents of an output image at the moment when a determination result by the human presence determining part 12 has changed. However, the present invention is not limited to this configuration. For example, the image creating device 100 may set a predetermined delay time from the moment when the determination result by the human presence determining part 12 has changed to the moment when it switches the contents of the output image. This is to prevent the contents of the output image from being frequently switched.

Figure 22:
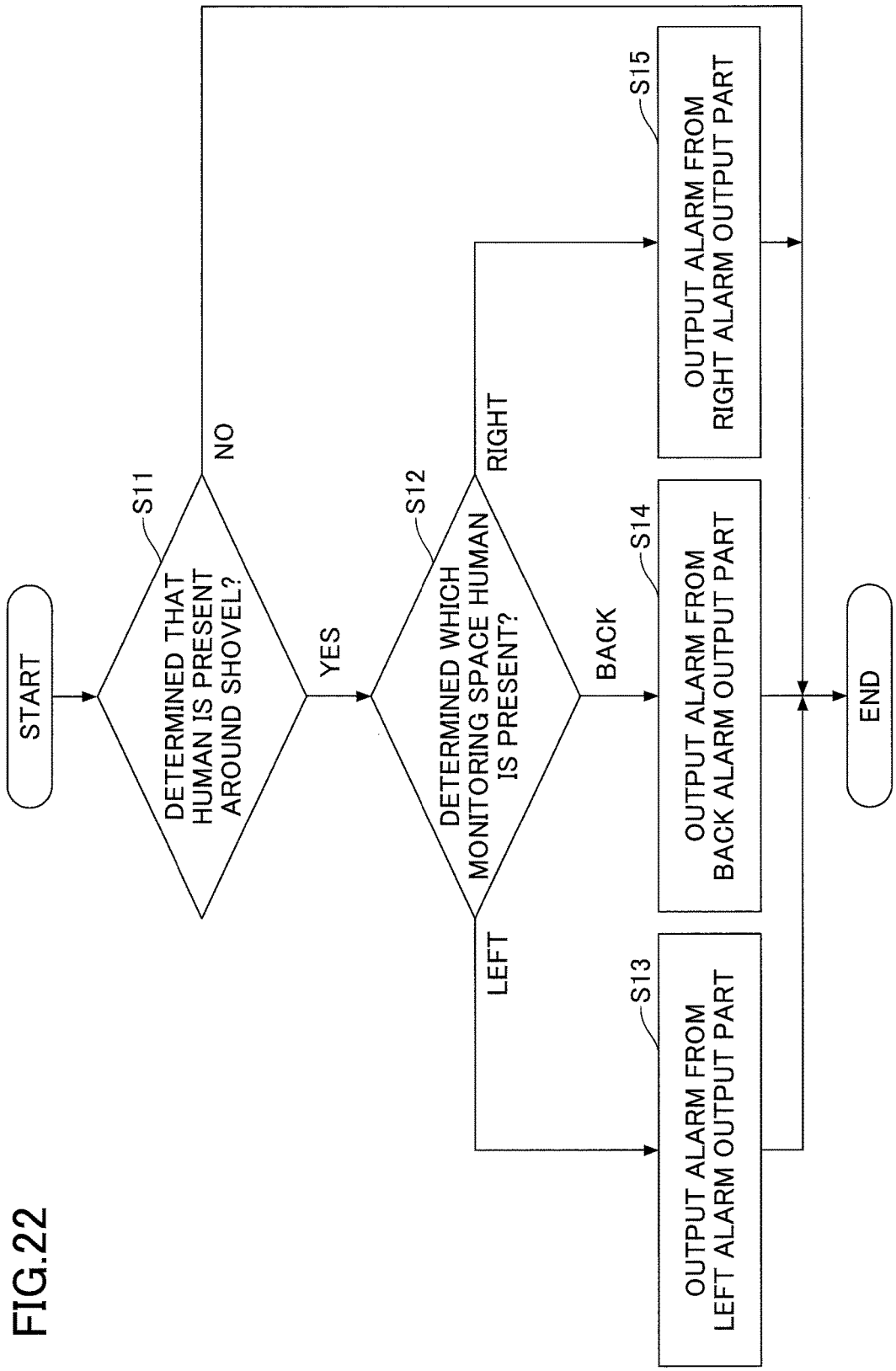
FIG. 22 is a flowchart of an alarm controlling process.
Figure 23A:
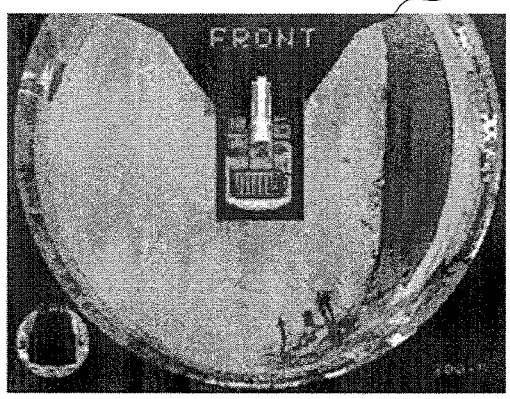
FIG. 23A is a photographic illustration of an output image.
Figure 23B:
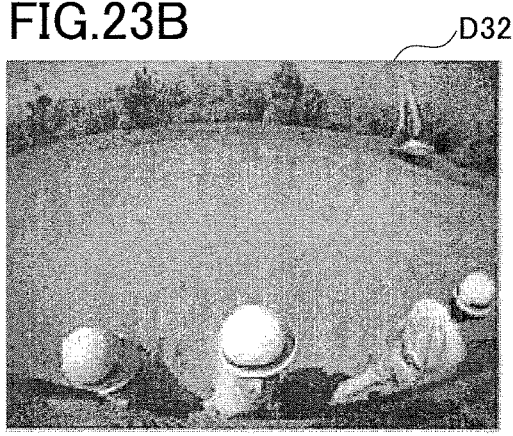
FIG. 23B is a photographic illustration of an output image.
Figure 23C:
FIG. 23C is a photographic illustration of an output image.
Figure 23D:
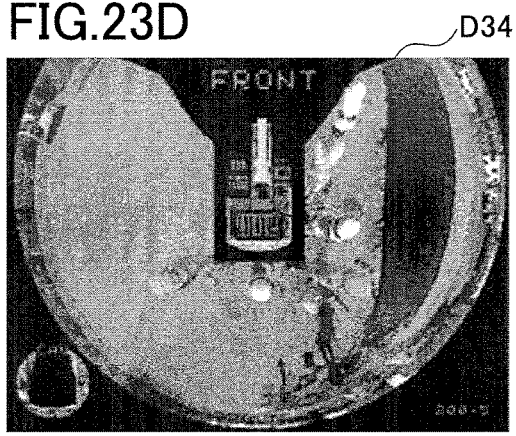
FIG. 23D is a photographic illustration of an output image.
Figure 23E:
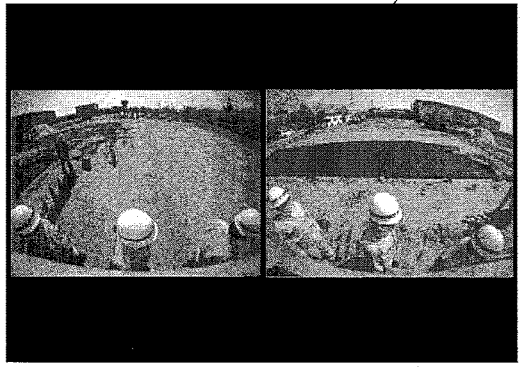
FIG. 23E is a photographic illustration of an output image.
Figure 23F:
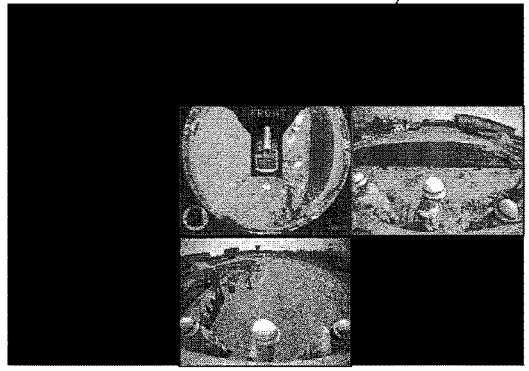
FIG. 23F is a photographic illustration of an output image.

Next, referring to FIGS. 22 and 23A~23F, a process in which the alarm controlling part 13 controls the alarm output part 7 based on a determination result by the human presence determining part 12 (hereinafter, referred to as "alarm controlling process" will be described. FIG. 22 is a flowchart illustrating a flow of the alarm controlling process. FIGS. 23A~23F are photographic illustrations of output images displayed during the alarm controlling process. Also, the alarm controlling part 13 performs this alarm controlling process repeatedly at a predetermined frequency. Also, the image creating device 100 is mounted on the shovel 60 shown in FIG. 11.

First, the human presence determining part 12 determines whether a human exists around the shovel 60 (step S11). At this time, the image creating part 11 creates a perimeter-monitoring virtual viewpoint image as shown in the output image D31 in FIG. 23A and displays it.

If the human presence determining part 12 has determined that a human exists around the shovel 60 (YES at step S11), the human presence determining part 12 determines which monitoring space, out of the left monitoring space ZL, the back monitoring space ZB, and the right monitoring space ZR, the human exists (step S12).

Then, if the human presence determining part 12 has determined that the human exists only in the left monitoring space ZL (left at step S12), the human presence determining part 12 outputs a left detection signal to the alarm controlling part 13. The alarm controlling part 13, which has received the left detection signal, outputs an alarm start signal to the left alarm output part 7L to cause the left alarm output part 7L to emit an alarm (step S13). Also, the image creating part 11 displays as an output image a through-image of the left camera 2L as shown in the output image D32 in FIG. 23B, for example. Alternatively, for example, as shown in the output image D33 in FIG. 23C, the image creating part 11 may display as a first output image (an image at the right in the figure) a perimeter-monitoring virtual viewpoint image and may display as a second output image (an image at the left in the figure) a through-image of the left camera 2L.

Also, if the human presence determining part 12 has determined that a human exists only in the back monitoring space ZB (back at step S12), the human presence determining part 12 outputs a back detection signal to the alarm controlling part 13. Then, the alarm controlling part 13, which has received the back detection signal, outputs an alarm start signal to the back alarm output part 7B to cause the back alarm output part 7B to emit an alarm (step S14). Also, the image creating part 11 displays as an output image a through-image of the back camera 2B, for example. Alternatively, the image creating part 11 may display as a first output image a perimeter-monitoring virtual viewpoint image and may display as a second output image a through-image of the back camera 2B.

Also, if the human presence determining part 12 has determined that a human exists only in the right monitoring space ZR (right at step S12), the human presence determining part 12 outputs a right detection signal to the alarm controlling part 13. Then, the alarm controlling part 13, which has received the right detection signal, outputs an alarm start signal to the right alarm output part 7R to cause the right alarm output part 7R to emit an alarm (step S15). Also, the image creating part 11 displays as an output image a through-image of the right camera 2R, for example. Alternatively, the image creating part 11 may display as a first output image a perimeter-monitoring virtual viewpoint image and may display as a second output image a through-image of the right camera 2R.

In contrast, if the human presence determining part 12 has determined that a human does not exist around the shovel 60 (NO at step S11), the human presence determining part 12 terminates the alarm controlling process in this time without outputting a detection signal to the alarm controlling part 13.

If it has been determined by the human presence determining part 12 that a human exists in more than one monitoring space out of the left monitoring space ZL, the back monitoring space ZB, and the right monitoring space ZR, the alarm controlling part 13 causes more than one corresponding alarm output part out of the left alarm output part 7L, the back alarm output part 7B, and the right alarm output part 7R to emit an alarm. Also, if it has been determined by the human presence determining part 12 that a human exists in more than one monitoring space out of the left monitoring space ZL, the back monitoring space ZB, and the right monitoring space ZR, the image creating part 11 displays an output image in the manner described in the above embodiments. Specifically, the image creating part 11 may display only a perimeter-monitoring virtual viewpoint image as shown in the output image D34 in FIG. 23D. Also, the image creating part 11 may display more than one through-image concurrently as shown in the output image D35 in FIG. 23E. Also, the image creating part 11 may display a perimeter-monitoring virtual viewpoint image and more than one through-image concurrently as shown in the output image D36 in FIG. 23F.

Also, in a configuration where an alarm sound is emitted from the alarm output part 7, the image creating device 100 may vary properties (a pitch, an output interval, or the like) of each alarm sound emitted from the left alarm output part 7L, the back alarm output part 7B, and the right alarm output part 7R. Similarly, in a configuration where a light is emitted from the alarm output part 7, the image creating device 100 may vary properties (a color, a light emission interval, or the like) of each light emitted from the left alarm output part 7L, the back alarm output part 7B, and the right alarm output part 7R. These are to allow an operator of the shovel 60 to more intuitively recognize a rough position of a human existing around the shovel 60 based on the difference in the properties of the alarm.

According to the above configuration, the image creating device 100 enables an operator of the shovel 60 to intuitively grasp a rough position of a worker existing around the shovel 60. For example, even if the image creating device 100 is not detecting an exact position of the worker, if once the image creating device 100 has determined which direction out of a left, a back, and a right of the shovel 60 the worker exists, the image creating device 100 can pass on the determined direction to the operator of the shovel 60 so that the operator can grasp the determined direction intuitively.

Also, in the above embodiment, the alarm output part 7 is comprised of three independent buzzers. However, it may localize a sound by using a surround system including a plurality of speakers.

Although the preferred embodiments of the present invention have been explained in detail, the present invention is not limited to the above-mentioned embodiments and various variations and replacements may be applied to the above-mentioned embodiments without departing from the scope of the present invention.

For example, in the above-mentioned embodiments, although the image creating device 100 uses the cylindrical space model MD as a space model, the image creating device 100 may use a space model having other columnar shapes such as a polygonal column, or may use a space model configured by two surfaces, which are a bottom surface and a side surface, or may use a space model having only a side surface.

Also, the image creating device 100 is mounted, together with a camera and a human detection sensor, onto a self-propelled shovel equipped with movable members such as a bucket, an arm, a boom, a turning mechanism, etc. Then, the image creating device 100 constitutes an operation assisting system, which assists a travel of the shovel and an operation of those movable members while displaying an image of surroundings to the operator. However, the image creating device 100 may be mounted, together with a camera and a human detection sensor, onto a working machine, such as a folk lift, an asphalt finisher, etc., which does not have a turning mechanism. Alternatively, the image creating device 100 may be mounted, together with a camera and a human detection sensor, onto a working machine, such as an industrial machine, a fixed crane, etc., which has a movable member but is not self-propelled. Then, the image creating device 100 may constitute an operation assisting system which assists an operation of those working machines.

Figure 24:
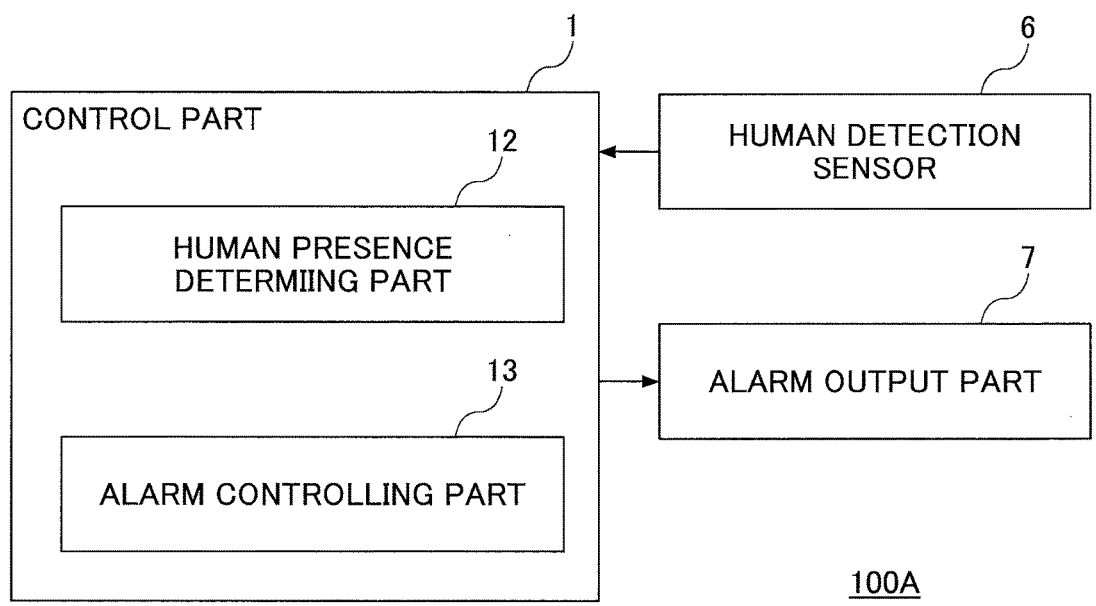
FIG. 24 is a block diagram schematically illustrating a structure of a perimeter-monitoring device.

Also, the perimeter-monitoring device has been described while using as an example the image creating device 100 including the camera 2 and the display part 5. However, it may be configured as a device not including an image displaying function by the camera 2, the display part 5, or the like. For example, as shown in FIG. 24, the perimeter-monitoring device 100A as a device performing an alarm controlling process may omit the camera 2, the input part 3, the storage part 4, the display part 5, the coordinates-associating part 10, and the image creating part 11.

The above-mentioned embodiments can provide a perimeter-monitoring device for a working machine that allows an operator of the working machine to intuitively grasp a position of a human around the working machine.

What is claimed is:

1. A shovel, comprising:
a traveling body;
a turning body mounted on the traveling body;
an attachment attached to a front part of the turning body;
a cab mounted on the turning body and located on the left side of the attachment;
a side camera;
a back camera;
a display part configured to concurrently display an output image showing situations at the side and back of the turning body;
a determining part configured to determine presence or absence of an object at the side and/or back of the turning body; and
an audio output device installed in the cab,
wherein, when an object is present at the side of the turning body, the audio output device emits a sound from the side of the cab toward an operator seat, and
wherein, when an object is present at the back of the turning body, the audio output device emits a sound from the back of the cab toward the operator seat.

2. The shovel as claimed in claim 1,
wherein the operator seat is the only seat installed in the cab.

3. The shovel as claimed in claim 1,
wherein the audio output device includes:
a first audio output device located in the cab and lateral to the operator seat; and
a second audio output device located in the cab and behind the operator seat,
wherein, when an object is present at the side of the turning body, the first audio output device emits a sound, and
wherein, when an object is present at the back of the turning body, the second audio output device emits a sound.

4. The shovel as claimed in claim 1,
wherein the display part displays a computer graphics image of the shovel, and
wherein the output image is a viewpoint conversion image surrounding the computer graphics image.

5. The shovel as claimed in claim 1,
wherein the determining part determines whether an object is present at the side of the turning body based on a first image showing a situation at the side of the turning body and determines whether an object is present at the back of the turning body based on a second image showing a situation at the back of the turning body, and
wherein the display part displays the output image created by using the first image and the second image.

* * * * *